United States Patent [19]
Goto

[11] Patent Number: 6,087,028
[45] Date of Patent: Jul. 11, 2000

[54] FUEL-CELLS SYSTEM AND METHOD OF REGULATING TEMPERATURE IN FUEL-CELLS SYSTEM

[75] Inventor: Sogo Goto, Toyota, Japan

[73] Assignee: Toyota Jidosha Kabushiki Kaisha, Toyota, Japan

[21] Appl. No.: 09/092,056

[22] Filed: Jun. 5, 1998

[30]     Foreign Application Priority Data

Jun. 6, 1997  [JP]  Japan ................................. 9-165130

[51] Int. Cl.[7] .................................................. H01M 8/04
[52] U.S. Cl. ................................. 429/24; 429/26; 429/62
[58] Field of Search ............................... 429/24, 26, 62, 429/23

[56]               References Cited

U.S. PATENT DOCUMENTS

| | | | |
|---|---|---|---|
| 3,253,957 | 5/1966 | Turner et al. .............................. | 429/24 |
| 3,539,397 | 11/1970 | Keating, Jr. et al. ..................... | 429/24 |
| 3,595,699 | 7/1971 | Baude .................................... | 136/86 B |
| 4,640,873 | 2/1987 | Tajima et al. ............................ | 429/24 |

FOREIGN PATENT DOCUMENTS

| | | |
|---|---|---|
| 195 17 813 A1 | 11/1996 | Germany . |
| 2-846 | 1/1990 | Japan . |
| 6-188013 | 7/1994 | Japan . |

*Primary Examiner*—Kathryn Gorgos
*Assistant Examiner*—Thomas H Parsons
*Attorney, Agent, or Firm*—Oblon, Spivak, McClelland, Maier & Neustadt, P.C.

[57]                 ABSTRACT

In a fuel-cells system 20, cooling water circulating through a cooling water flow path 28 is heated by heat exchange carried out in fuel cells 22, subsequently cooled down by a radiator 26, and fed again to the fuel cells 22. A cooling water pump 30 gives a driving force used for circulating the cooling water through the cooling water flow path 28. A control unit 50 of the fuel-cells system 20 measures an inlet cooling water temperature T1 and an outlet cooling water temperature T2 of the fuel cells 22 and calculates a difference ΔT between the observed temperatures T1 and T2. When the difference ΔT is not less than a reference value set equal to 5° C., the control unit 50 determines that a distribution of internal temperature of the fuel cells 22 is in a predetermined non-uniform state. The control unit 50 then increases the driving voltage of the cooling water pump 30 to equalize the internal temperature of the fuel cells 22.

20 Claims, 11 Drawing Sheets

FUEL-CELLS SYSTEM AND METHOD OF REGULATING TEMPERATURE IN FUEL-CELLS SYSTEM

BACKGROUND OF THE INVENTION

1. Field of the Invention

The present invention relates to a fuel-cells system including fuel cells that receive supplies of gaseous fuel and oxidizing gas and generate an electromotive force, and also to a method of regulating the temperature in the fuel-cells system.

2. Description of the Prior Art

Fuel cells (hereinafter may be referred to as FC) receive a supply of gaseous fuel containing at least hydrogen on an anode thereof and a supply of oxidizing gas containing at least oxygen on a cathode thereof and generate an electromotive force through electrochemical reactions. Equations (1) through (3) given below represent electrochemical reactions proceeding in the fuel cells. Equation (1) shows the reaction proceeding at the anode, whereas Equation (2) shows the reaction proceeding at the cathode. The reaction shown by Equation (3) accordingly proceeds as a whole in the fuel cells.

  (1)

  (2)

  (3)

The fuel cells receive a supply of fuel and convert the chemical energy of the fuel directly into electrical energy at a high energy efficiency. In the actual operation of the fuel cells, however, the above electrochemical reactions do not proceed at the efficiency of 100%. Part of the chemical energy of the fuel is not taken out as the electrical energy but is released as heat to the outside. A fuel-cells system including such fuel cells accordingly requires a structure that removes the heat produced during the operation of the fuel cells and keeps the driving temperature of the fuel cells in a predetermined temperature range.

Cooling water is generally used to remove the heat produced during the operation of the fuel cells. The fuel cells are constructed as a stack structure in which a plurality of unit cells are laid one upon another. A flow path of a predetermined configuration is formed in the stack structure. Cooling water is flown through the flow path to remove the heat produced in the process of the electrochemical reactions and keep the driving temperature of the fuel cells in a predetermined temperature range. In a known fuel-cells system (for example, JAPANESE PATENT LAID-OPEN GAZETTE No. 6-188013), a heat exchange unit, such as a radiator, cools down the hot cooling water that has been flown through the flow path in the fuel cells to remove the heat produced in the process of the electrochemical reactions. The cold cooling water after the heat exchange is again fed to the flow path in the fuel cells. This structure prevents the temperature in the fuel cells from increasing excessively and enables the driving temperature of the fuel cells to be kept to or below a predetermined level.

The quantity of heat produced in the fuel cells depends upon the degree of the electrochemical reactions proceeding in the fuel cells and the efficiency of power generation in the fuel cells. In the prior art fuel-cells system, the on-off state of a cooling fan included in the radiator for cooling down the cooling water is controlled to change the cooling state of the cooling water (that is, the cooling power) with a variation in quantity of heat. The cooling water is circulated between the fuel cells and the radiator by means of a pump. When the internal temperature of the fuel cells (or the temperature of the cooling water corresponding to the internal temperature of the fuel cells) is not higher than a predetermined level, the cooling fan is turned off to stop the positive cooling process of the cooling water. When the internal temperature of the fuel cells becomes greater than the predetermined level, on the other hand, the cooling fan is turned on to start the positive cooling process of the cooling water. This procedure prevents the driving temperature of the fuel cells from exceeding the predetermined level.

The temperature control carried out in the prior art fuel-cells system can not sufficiently equalize the temperatures of the respective unit cells, however, while enabling the driving temperature of the fuel cells to be kept to or below the predetermined level. Namely, the prior art temperature control can not ensure the performance of the fuel cells sufficiently. Even when the mean driving temperature of the stack of fuel cells is not higher than the predetermined level, the unit cells constituting the stack of fuel cells include those having relatively high temperatures and those having relatively low temperatures. This causes the respective unit cells to have different output voltages. The following describes the relationship between the driving temperature of the fuel cells and the output voltage.

FIG. 11 is a graph showing the output voltage of a fuel cell plotted against the driving temperature of the fuel cell when the output current density of the fuel cell is kept constant. The fuel cell has an optimum driving temperature Ta that gives the maximum output voltage as shown in the graph of FIG. 11. In the case that a supply of gaseous fuel fed to the fuel cell has a sufficient concentration of steam, the optimum driving temperature Ta is substantially kept constant even when the magnitude of loading connected to the fuel cell varies to some extent. For example, the optimum driving temperature of polymer electrolyte fuel cells is approximately 80° C. Each unit cell included in the stack of fuel cells has this relationship between the driving temperature and the output voltage. In order to improve the performance of the fuel cells, it is desirable that the driving temperature of each unit cell included in the stack of fuel cells is always kept to a constant value, which is as close as possible to the optimum driving temperature Ta.

The distribution of the temperatures of the respective unit cells included in the stack of fuel cells is ascribed to the difference in the progress of electrochemical reactions proceeding in the respective unit cells, as well as to the effects of the outside temperature and to the temperature gradient between an inlet and an outlet of cooling water in the fuel cells. The prior art structure that changes over the on-off state of the cooling fan to control the positive cooling process of the cooling water, which is circulated between the fuel cells and the radiator, can not sufficiently equalize the temperatures of the respective unit cells at a desired level. Any proposed structures can not equalize the temperatures of the respective unit cells included in the stack of fuel cells in a desirable temperature range.

SUMMARY OF THE INVENTION

The object of the present invention is thus to equalize the internal temperatures of the respective unit cells included in a stack of fuel cells in a desired temperature range that is close to the optimum driving temperature of the respective unit cells.

At least part of the above and the other related objects is realized by a fuel-cells system including a fuel cell which receives a supply of gaseous fuel containing at least hydrogen and a supply of oxidizing gas containing at least oxygen and generates an electromotive force through an electrochemical reaction of the gaseous fuel and the oxidizing gas. The fuel-cells system includes: a cooling liquid feed unit which feeds a cooling liquid to the fuel cell, the cooling liquid passing through the fuel cell and thereby cooling down the fuel cell; a temperature distribution detection unit which detects a value reflecting a state of temperature distribution in the fuel cell; and a cooling liquid feed control unit which determines whether or not the state of temperature distribution in the fuel cell corresponds to a predetermined non-uniform state, based on the detection by the temperature distribution detection unit, and when the state of temperature distribution is determined to be the predetermined non-uniform state, controls the cooling liquid feed unit to increase a flow of the cooling liquid fed to the fuel cell per unit time.

The present invention is also directed to a method of regulating temperature in a fuel-cells system including a fuel cell which receives a supply of gaseous fuel containing at least hydrogen and a supply of oxidizing gas containing at least oxygen and generates an electromotive force through an electrochemical reaction of the gaseous fuel and the oxidizing gas. The method includes the steps of:

(a) feeding a cooling liquid for cooling down the fuel cell to the fuel cell and causing the cooling liquid to pass through the fuel cell;

(b) detecting a value reflecting a distribution of internal temperature of the fuel cell;

(c) determining whether or not the distribution of internal temperature of the fuel cells is in a predetermined non-uniform state, based on the value detected in the step (b); and (d) increasing a flow of the cooling liquid flowing through the fuel cell per unit time, when it is determined in the step (c) that the distribution of internal temperature of the fuel cell is in the predetermined non-uniform state.

In the fuel-cells system of the present invention thus constructed and the corresponding method of regulating temperature in the fuel-cells system, when the state of temperature distribution in the fuel cells is determined to be a predetermined non-uniform state, the flow of the cooling liquid fed to the fuel cells per unit time, that is, the flow rate of the cooling liquid, is increased to quickly equalize the internal temperature of the fuel cells. The increased flow of the cooling liquid per unit time reduces the temperature gradient of the cooling liquid between an inlet end and an outlet end of the fuel cells. When there is a scatter in temperature between unit cells constituting the fuel cells, this structure effectively equalizes the temperature distribution in the unit cells. When there is a scatter in temperature in one unit cell, this structure enhances the flow rate of the cooling liquid, thereby equalizing the temperature distribution in the unit cell.

The cooling liquid may be water or an antifreezing solution under the low-temperature conditions. The internal temperature of the fuel cells may be measured directly as the value reflecting the state of temperature distribution in the fuel cells. The temperature of a site reflecting the internal temperature of the fuel cells may otherwise be measured as the reflecting value. The temperature of the cooling liquid passing through the fuel cells is, for example, measured as the temperature of the site reflecting the internal temperature of the fuel cells. Another application measures the output voltage of each unit cell included in the fuel cells, instead of the temperature. This value also represents the state of temperature distribution in the fuel cells.

In accordance with one preferable application of the fuel-cells system, the temperature distribution detection unit detects a difference between a temperature of the cooling liquid flown into the fuel cell and a temperature of the cooling liquid flown out of the fuel cell as the value reflecting the state of temperature distribution in the fuel cell, and the cooling liquid feed control unit determines that the state of temperature distribution in the fuel cell corresponds to the predetermined non-uniform state when the detected difference is not less than a predetermined value.

The fuel-cells system of this preferable structure detects the difference between the temperature of the cooling liquid flown into the fuel cells and the temperature of the cooling liquid flown out of the fuel cells, thereby enabling the state of temperature distribution in the fuel cells to be readily determined. The smaller temperature difference reduces the temperature gradient in the fuel cells. The temperature difference is accordingly used to estimate the degree of scatter in temperature between unit cells and the degree of scatter in temperature in a unit cell.

In accordance with another preferable application of the present invention, the fuel-cells system further includes: a load which receives a supply of electric power from the fuel cell; a loading state detection unit which determines magnitude of the load; a cooling liquid cooling unit which cools down the cooling liquid that is fed to the fuel cell; and a cooling state control unit which controls the cooling liquid cooling unit to cool down the cooling liquid when the magnitude of the load determined by the loading state detection unit is not less than a preset value.

The fuel-cells system of this structure effectively prevents the temperature of the fuel cells from increasing excessively, when the quantity of heat produced in the fuel cells increases with an increase in magnitude of the load. Controlling the cooling state and the flow rate of the cooling liquid enables the internal temperature of the fuel cells to be equalized in the state close to a desired temperature.

It is preferable that the loading state detection unit determines the magnitude of the load, based on the temperature of the cooling liquid flown out of the fuel cell. The temperature of the cooling liquid discharged from the fuel cells is close to the internal temperature of the fuel cells. The internal temperature of the fuel cells can thus be estimated with a sufficient accuracy from the observed temperature of the cooling liquid discharged from the fuel cells. The quantity of heat produced in the fuel cells increases with an increase in magnitude of the load, and raises the internal temperature of the fuel cells. Estimation of the internal temperature of the fuel cells allows the control according to the variation in magnitude of loading.

In accordance with still another preferable application of the present invention, the fuel-cells system further includes an outer temperature detection unit which detects a value reflecting an outer or external temperature, wherein the cooling state control unit controls the cooling liquid cooling unit, based on the result of the determination by the loading state detection unit as well as on the value reflecting the outer temperature detected by the outer temperature detection unit.

In the fuel-cells system of this structure, the internal temperature of the fuel cells can be kept in a desired temperature range with a higher accuracy. The variation in temperature of the cooling liquid used for cooling down the fuel cells is affected by the outer temperature. Regulation of the cooling state of the cooling liquid according to the outer temperature prevents the temperature of the cooling liquid and thereby the internal temperature of the fuel cells from being excessively lowered under the condition of low outer temperature. It is not necessary to measure the outer temperature itself as the value reflecting the outer temperature. Any value directly or indirectly affected by the outer temperature may be used as the reflecting value. One exemplified procedure measures a variation in temperature of the cooling liquid, determines that the outer temperature is low when the temperature of the cooling liquid decreases under the non-cooling condition, and controls the cooling liquid cooling unit based on the result of the determination.

In accordance with another preferable application of the fuel-cells system, the cooling liquid cooling unit includes an air-cooling unit which cools down the cooling liquid fed to the fuel cell. In this structure, the fuel-cells system further includes: an ingested air state detection unit which detects a value reflecting a flow rate of an external air that is ingested from outside and passes through the air-cooling unit; and an outer air restriction unit which restricts a flow of the external air that passes through the air-cooling unit, when the value reflecting the flow rate of the external air detected by the ingested air state detection unit is not less than a predetermined value.

This structure effectively prevents the fuel cells from being overcooled. In case that the external air is flown into the air-cooling unit at a high flow rate, the positive cooling process with the external air is carried out to cool down the cooling liquid. When only a small quantity of heat is produced in the fuel cells, the positive cooling process may result in lowering the internal temperature of the fuel cells excessively. In the case that the external air passing through the air-cooling unit has a high flow rate, this structure restricts the flow of the external air, thereby preventing the fuel cells from being overcooled. These and other objects, features, aspects, and advantages of the present invention will become more apparent from the following detailed description of the preferred embodiments with the accompanying drawings.

DESCRIPTION OF THE PREFERRED EMBODIMENT

Figure 1:
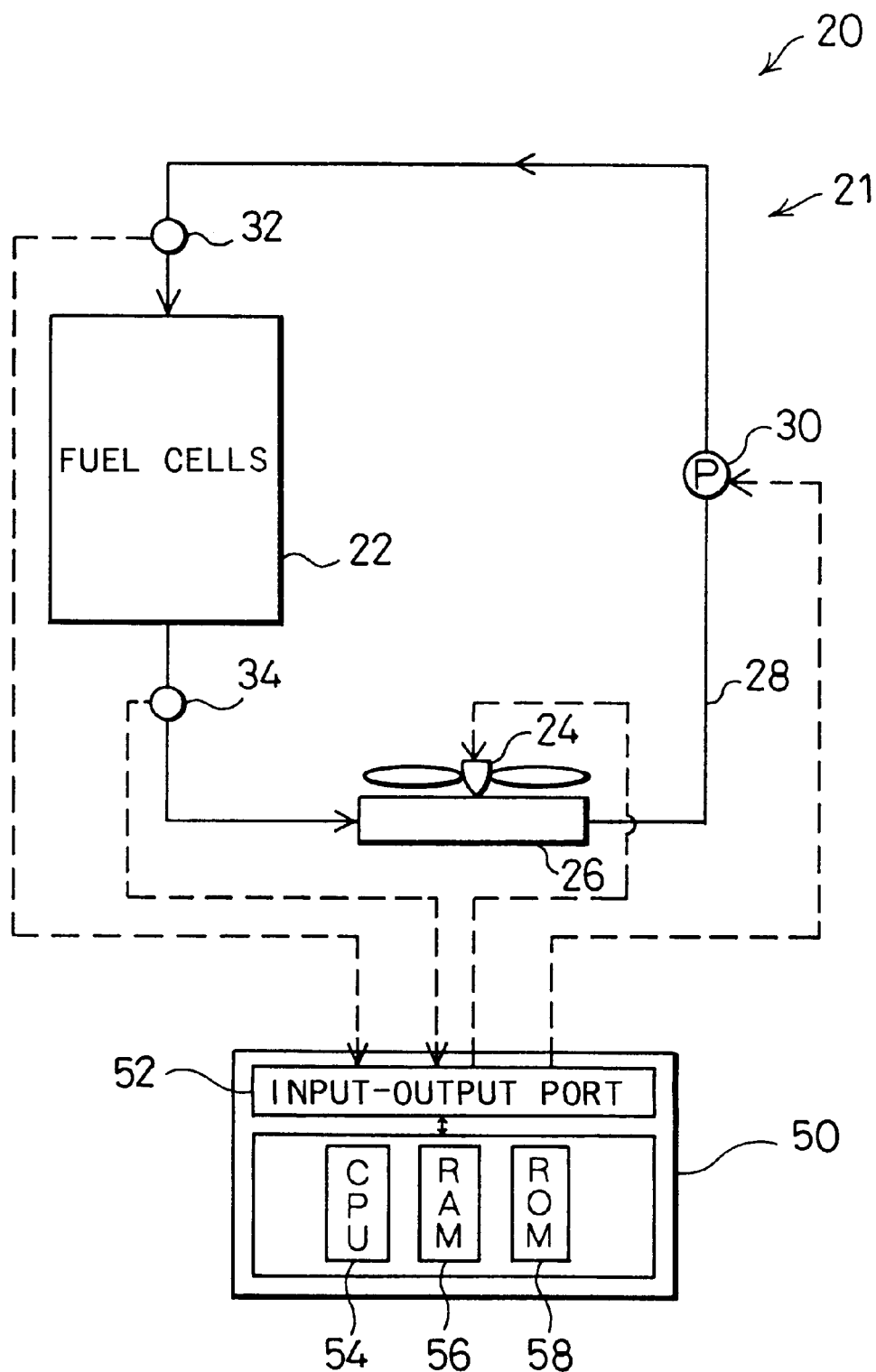
FIG. 1 schematically illustrates structure of an essential part of a fuel-cells system 20 as a preferred embodiment according to the present invention.

One mode of carrying out the present invention is described below as a preferred embodiment. FIG. 1 schematically illustrates structure of an essential part of a fuel-cells system 20 as a preferred embodiment according to the present invention. The fuel-cells system 20 of this embodiment is mounted on an electric vehicle to feed a supply of electric power to a motor for driving the vehicle. The fuel-cells system 20 includes a stack of fuel cells 22 as the main body of power generation, a radiator 26 with a cooling fan 24, a cooling water flow path 28 that connects a flow path of cooling water formed in the fuel cells 22 with a flow path of the cooling water formed in the radiator 26, a cooling water pump 30 that generates a driving force for circulating the cooling water in the cooling water flow path 28, and a control unit 50. The radiator 26, the cooling water flow path 28, the cooling water pump 30, and the control unit 50 constitute a cooling water system 21 which feeds and discharges the cooling water to and from the fuel cells 22, in order to keep the driving temperature of the fuel cells 22 within a predetermined range. FIG. 1 illustrates only the constituents related to the cooling water system 21 among a variety of constituents of the fuel-cells system 20. The fuel-cells system 20 includes a gaseous fuel system and an oxidizing gas system discussed later, as well as the cooling water system 21. The following describes the details of the respective constituents included in the fuel-cells system 20.

Figure 2:
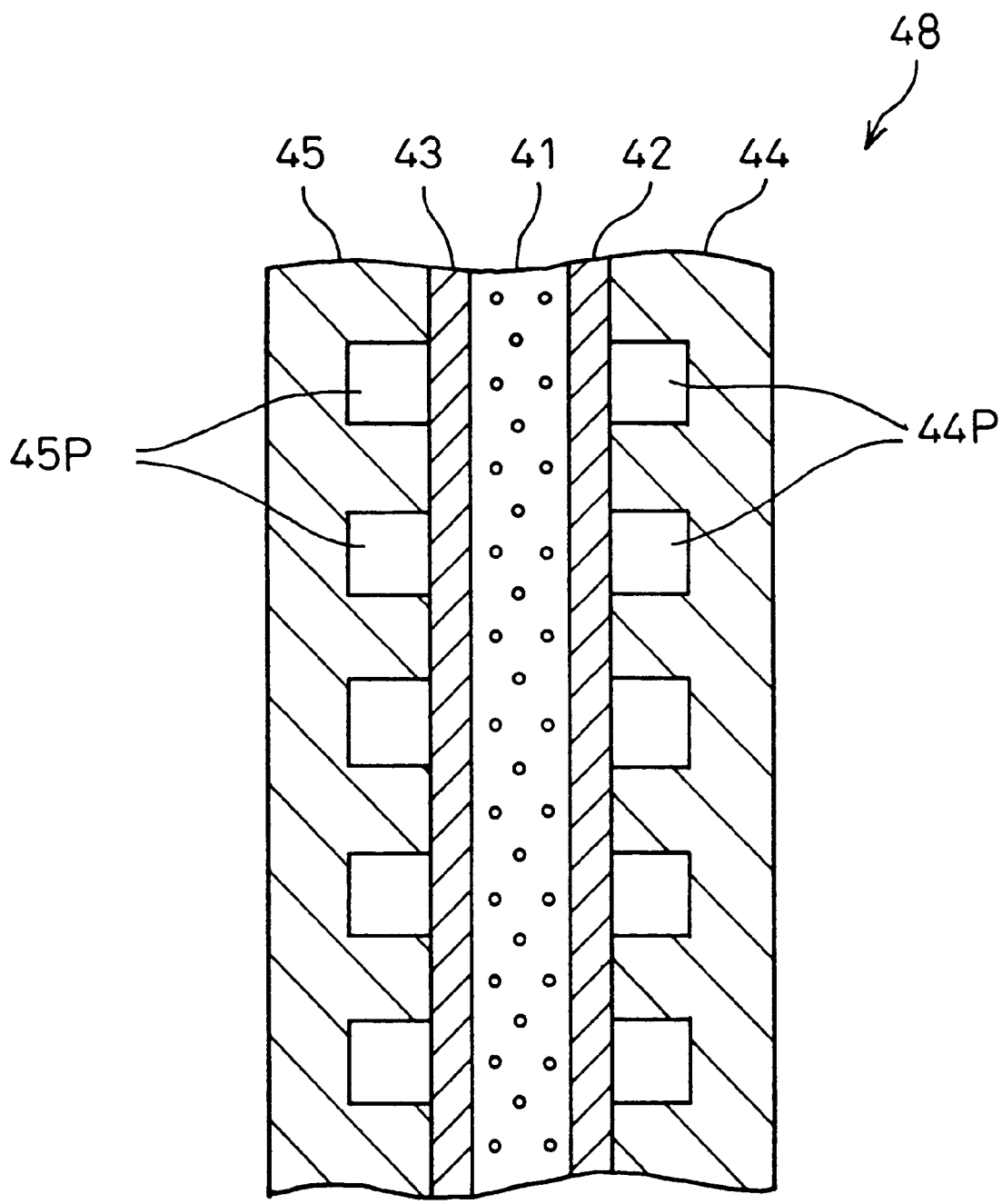
FIG. 2 is a cross sectional view schematically illustrating the structure of unit cells 48 constituting a stack of fuel cells 22.

The fuel cells 22 are constructed and operated in the following manner. The fuel cells 22 are polymer electrolyte fuel cells and have a stack structure in which a plurality of unit cells are laid one upon another. When the fuel cells 22 receive a supply of gaseous fuel containing hydrogen at the anode and a supply of oxidizing gas containing oxygen at the cathode, the electrochemical reactions expressed by Equations (1) through (3) given above proceed in the fuel cells 22. FIG. 2 is a cross sectional view illustrating structure of unit cells 48 constituting the fuel cells 22. Each unit cell 48 includes an electrolyte film 41, an anode 42, a cathode 43, and separators 44 and 45.

The anode 42 and the cathode 43 are gas diffusion electrodes arranged across the electrolyte film 41 to construct a sandwich-like structure. The separators 44 and 45 are disposed outside the sandwich-like structure and respectively connected to the anode 42 and the cathode 43 to form flow paths of gaseous fuel and oxidizing gas. Flow paths 44P of gaseous fuel are defined by the anode 42 and the separator 44, whereas flow paths 45P of oxidizing gas are defined by the cathode 43 and the separator 45. Although the separators 44 and 45 form the flow paths only on the respective one faces thereof in the drawing of FIG. 2, the separators 44 and 45 actually have ribs on both faces thereof. Each of the separators 44 and 45 is linked with the anode 42 of one unit cell 48 to define the flow paths 44P of gaseous fuel and with the cathode 43 of the adjoining unit cell 48 to define the flow paths 45P of oxidizing gas. The separators 44 and 45 are joined with the gas diffusion electrodes 42 and 43 to form the gas flow paths 44P and 45P, while separating the flow of gaseous fuel from the flow of oxidizing gas between the adjoining unit cells 48. When the unit cells 48 are laid one upon another to constitute the stack structure, the two separators located on both ends of the stack structure may have ribs only on the respective one faces that are in contact with the gas diffusion electrodes.

The electrolyte film 41 is a proton-conductive ion-exchange film composed of a polymer material, such as fluororesin, and shows favorable electrical conductivity in the wet state. In this embodiment, a Nafion film (manufactured by du Pont) is applied for the electrolyte film 41. The surface of the electrolyte film 41 is coated with platinum or a platinum-containing alloy functioning as a catalyst. The technique adopted in this embodiment to apply the catalyst prepares carbon powder with platinum or a platinum-containing alloy carried thereon, disperses the catalyst-carried carbon powder into an appropriate organic solvent, adds a specific amount of an electrolyte solution (for example, Nafion solution manufactured by Aldrich Chemical Corp.) to the dispersion to form a paste, and screen-prints the paste on the electrolyte film 41. Another available technique forms the paste containing the catalyst-carried carbon powder to a sheet and presses the sheet onto the electrolyte film 41.

The anode 42 and the anode 43 are made of carbon cloth, which is woven of yarns consisting of carbon fibers. Although the anode 42 and the cathode 43 are composed of carbon cloth in this embodiment, carbon paper or carbon felt consisting of carbon fibers are also favorably applicable for the material of the anode 42 and the cathode 43. In this embodiment, the platinum-containing catalyst is applied on the surface of the electrolyte film 41. In accordance with one modification, the paste of platinum-containing catalyst may be applied on the surfaces of the anode 42 and the cathode 43 that are in contact with the electrolyte film 41.

The separators 44 and 45 are made of a gas-impermeable conductive material, for example, gas-impermeable, dense carbon obtained by compressing carbon. Each of the separators 44 and 45 has a plurality of ribs formed in parallel on both surfaces thereof. As described previously, each of the separators 44 and 45 is joined with the surface of the anode 42 of one unit cell 48 to define the flow paths 44P of gaseous fuel and with the surface of the cathode 43 of the adjoining unit cell 48 to define the flow paths 45P of oxidizing gas. The ribs formed on the surface of each separator may have any shape that allows supplies of the gaseous fuel and the oxidizing gas to the gas diffusion electrodes, although the ribs are a plurality of grooves formed in parallel in this embodiment. The ribs formed on the respective surfaces of each separator may be arranged at predetermined angles, for example, at right angles.

Figure 3:
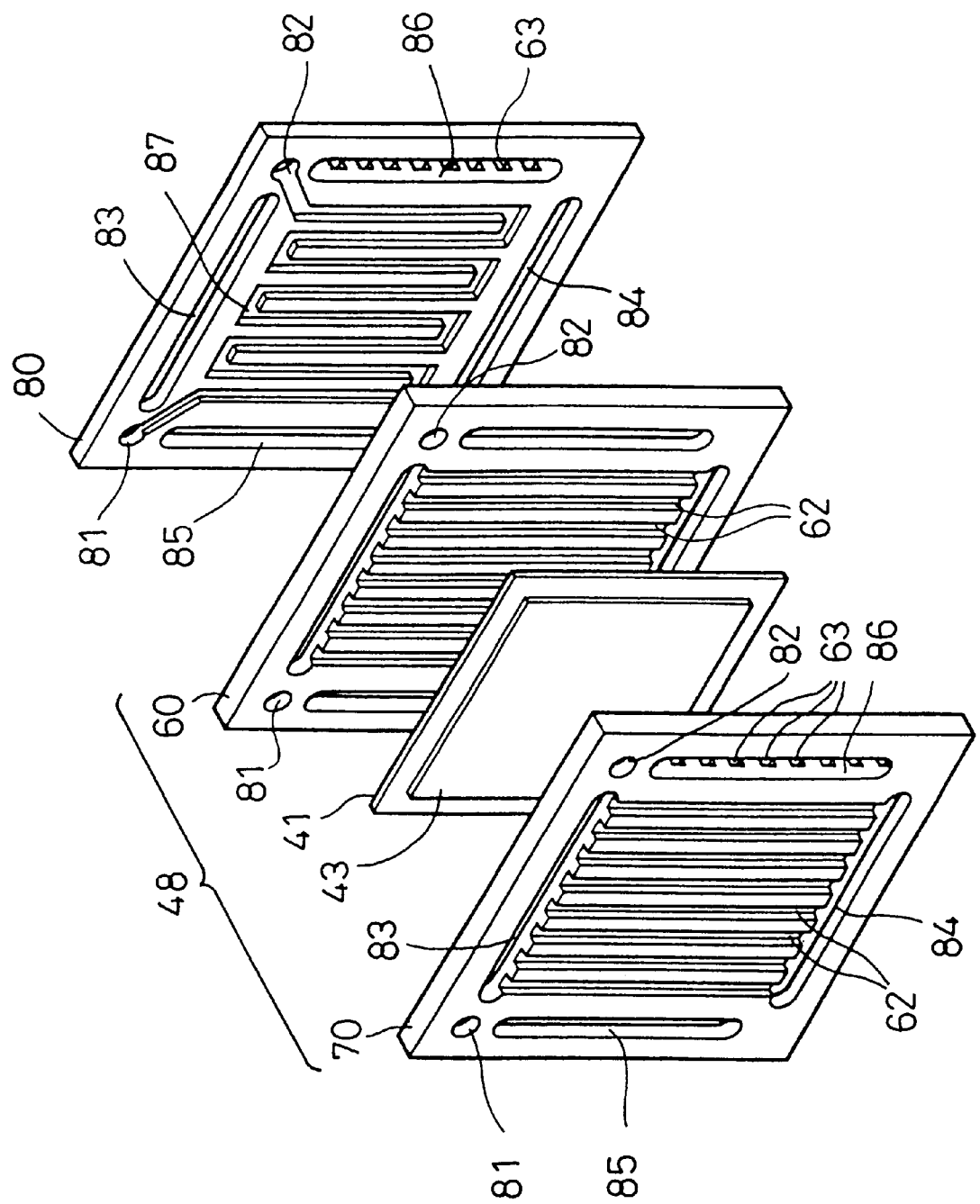
FIG. 3 is a decomposed perspective view illustrating stack structure of the fuel cells 22.

FIG. 3 is a decomposed perspective view illustrating the process of laminating the unit cells 48. In the actual stack structure, each of the separators 44 and 45 discussed above corresponds to one of terminal separators 60 and 61, an intermediate separator 70, and a cooling separator 80. These separators are formed to plates having square laminating planes. The terminal separator 61, which is not illustrated in FIG. 3, has the same structure as that of the other terminal separator 60 but is disposed in a different direction from that of the terminal separator 60. For convenience of explanation, different numerals 60 and 61 are allocated to the terminal separators. The following describes the detailed structures of the respective separators.

Each of the terminal separators 60 and 61, the intermediate separator 70, and the cooling separator 80 has cooling water holes 81 and 82 which have a circular cross section and are formed at two different positions in the circumferential portion of the separator (at both the upper corners in FIG. 3). When the unit cells 48 are laid one upon another to construct the stack structure, the cooling water holes 81 and 82 are joined respectively to form flow paths of cooling water that pass through the stack structure in the laminating direction. A pair of gaseous fuel slots 83 and 84 and a pair of oxidizing gas slots 85 and 86 are formed in the laminating planes along and in the vicinity of the respective sides of these three types of separators. When the unit cells 48 are placed one over another to construct the stack structure, the gaseous fuel slots 83 and 84 and the oxidizing gas slots 85 and 86 are joined respectively to form flow paths of hydrogen-containing gaseous fuel and flow paths of oxygen-containing oxidizing gas that pass through the stack structure in the laminating direction.

A plurality of grooves or ribs 62 arranged in parallel to one another are formed in one face of the terminal separator 60 (the front face in FIG. 3) to connect the opposite gaseous fuel slots 83 and 84 with each other. The ribs 62 are joined with the adjoining anode 42 to define the flow paths 44P of gaseous fuel in the stack structure. The other face of the terminal separator 60 (the rear face in FIG. 3) is a flat surface without grooves.

The plurality of grooves or ribs 62 arranged in parallel to one another are also formed in one face of the intermediate separator 70 (the front face in FIG. 3) to connect the opposite gaseous fuel slots 83 and 84 with each other. The ribs 62 are joined with the adjoining anode 42 to define the flow paths 44P of gaseous fuel in the stack structure. A plurality of grooves or ribs 63 arranged in parallel to one another and perpendicular to the ribs 62 are formed in the other face of the intermediate separator 70 (the rear face in FIG. 3) to connect the opposite oxidizing gas slots 85 and 86 with each other. The ribs 63 are joined with the adjoining cathode 43 to define the flow paths 45P of oxidizing gas in the stack structure.

The plurality of grooves or ribs 63 arranged in parallel to one another are also formed in one face of the cooling separator 80 (the rear face in FIG. 3) to connect the opposite oxidizing gas slots 85 and 86 with each other. The ribs 63 are joined with the adjoining cathode 43 to define the flow paths 45P of oxidizing gas in the stack structure. A serpentine groove 87 is formed in the other face of the cooling separator 80 (the front face in FIG. 3) to connect the cooling water holes 81 and 82 with each other. The cooling separator 80 adjoins to the terminal separator 60 in the stack structure as discussed later. The serpentine groove 87 is joined with the flat surface of the terminal separator 60 to define a cooling water channel 87P.

In this embodiment, these three types of separators are made of dense carbon as mentioned above. The separators may, however, be composed of another conductive material. For example, the terminal separators 60 and 61 and the cooling separator 80 may be made of a metal, such as a copper alloy or an aluminum alloy, which gives sufficient stiffness and heat transfer properties.

The separators discussed above are disposed across the sandwich-like structure of the anode 42 and the cathode 43 arranged across the electrolyte film 41 to construct the stack structure. Although one terminal separator 60, one intermediate separator 70, and one cooling separator 80 are illustrated in FIG. 3, a predetermined number of the intermediate separators 70 are laminated in succession in the actual stack structure. The number of succession of the intermediate separators 70 (or the ratio of the cooling separators 80 in the stack structure) is determined depending upon various conditions including the quantity of heat produced in each unit cell 48, which is estimated from the magnitude of the load connected to the fuel cells 22, the temperature of the cooling water fed to the fuel cells 22, and the range of the flow of the cooling water fed to the fuel cells 22. In this embodiment, one terminal separator 60 and one cooling separator 80 are placed after every lamination of five consecutive intermediate separators 70. The set of lamination including one cooling separator 80, one terminal separator 60, and five consecutive intermediate separators 70 is repeated in the direction from the back to the front in FIG. 3 to construct the stack structure.

As mentioned above, the terminal separator 61 is placed after lamination of the five consecutive intermediate separators 70 on the front end in FIG. 3 to construct the stack structure. The terminal separator 61 has the same structure as that of the terminal separator 60 but is oriented in a different way relative to the laminating direction from that of the terminal separator 60 shown in FIG. 3. The terminal separator 61 has a flat surface that faces outside the stack structure and a ribbed surface that faces inside the stack structure and comes into contact with the adjoining cathode 43. The ribs formed on the terminal separator 61 are arranged in parallel to the ribs 63 on the intermediate separator 70 shown in FIG. 3 and connected with the anode 43 to define the flow paths 45P of oxidizing gas.

Figure 4:
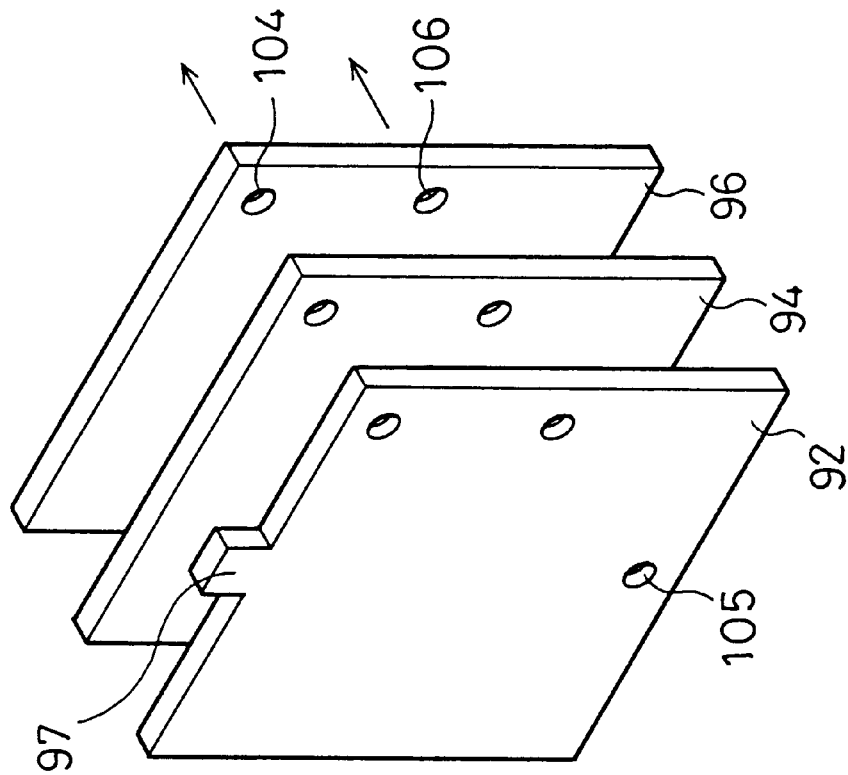
FIG. 4 is a decomposed perspective view illustrating constituents disposed on both ends of the fuel cells 22.
Figure 4:
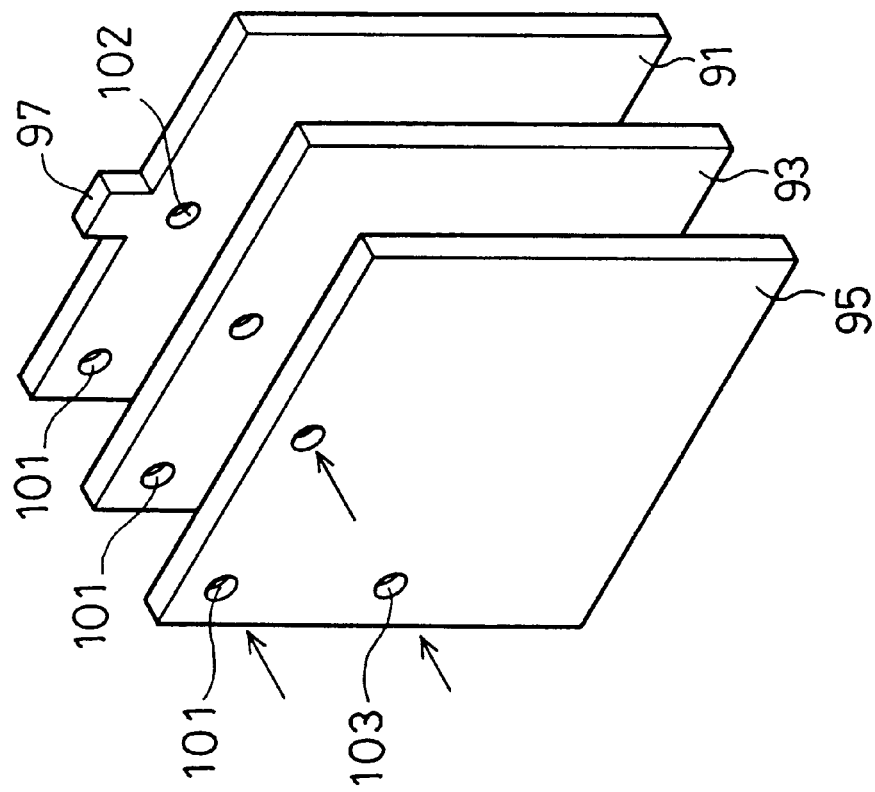

Current collector plates 91 and 92, insulation plates 93 and 94, and end plates 95 and 96 are further disposed across the lamination of the separators to complete the stack structure. FIG. 4 is a decomposed perspective view illustrating structures of the current collector plates 91 and 92, the insulation plates 93 and 94, and the end plates 95 and 96. The current collector plate 91, the insulation plate 93, and the end plate 95 are placed in this sequence on one end of the stack structure with the terminal separator 61 to constitute a supply end unit. The current collector plate 92, the insulation plate 94, and the end plate 96 are placed in this sequence on the other end of the stack structure to constitute an exhaust end unit.

Like the separators described above, the current collector plates 91 and 92, the insulation plates 93 and 94, and the end plates 95 and 96 are formed to plates having square laminating planes. The current collector plate 91, the insulation plate 93, and the end plate 95, which constitute the supply end unit, have a cooling water hole 101, a gaseous fuel inlet 102, and an oxidizing gas inlet 103 at the positions corresponding to the cooling water hole 81, the gaseous fuel slot 83, and the oxidizing gas slot 85. The current collector plate 92, the insulation plate 94, and the end plate 96, which constitute the exhaust end unit, have a cooling water hole 104, a gaseous fuel outlet 105, and an oxidizing gas outlet 106 at the positions corresponding to the cooling water hole 82, the gaseous fuel slot 84, and the oxidizing gas slot 86.

The current collector plates 91 and 92 are made of a material of high electrical conductivity, such as copper. The current collector plates 91 and 92 have terminals 97, via which the output from the fuel cells 22 is taken out. The insulation plates 93 and 94 are made of an insulating material, such as rubber or resin. The insulation plates 93 and 94 function to insulate the stack structure from the end plates 95 and 96 and a predetermined casing for accommodating the stack structure therein. The end plates 95 and 96 are made of a material of high stiffness, such as steel. In the stack of fuel cells (fuel-cells stack) prepared by laminating the unit cells 48, the end plates 95 and 96 located on the ends of the fuel-cells stack function to absorb the pressing force applied in the laminating direction from the outside.

The fuel-cells stack prepared by laminating the unit cells 48 is accommodated in the predetermined casing and kept under a predetermined pressing force applied in the laminating direction. The fuel cells 22 thus constructed are connected with the cooling water system 21 described above as well as with a gaseous fuel system and an oxidizing gas system.

The gaseous fuel system is a device that feeds and discharges a hydrogen-rich gaseous fuel to and from the fuel cells 22. The gaseous fuel may be gaseous hydrogen of high purity or a reformed gas obtained by reforming a hydrocarbon crude fuel. In the case that gaseous hydrogen is used as the gaseous fuel, the gaseous fuel system includes a gaseous hydrogen storage unit. The gaseous hydrogen may be compressed and stored in a tank or absorbed in a hydrogen-absorbing alloy.

The gaseous fuel system is connected to the gaseous fuel inlet 102 formed in the end plate 95 and introduces a supply of gaseous fuel into the fuel cells 22 via the gaseous fuel inlet 102. The gaseous fuel fed into the fuel cells 22 via the gaseous fuel inlet 102 is introduced into a gaseous fuel conduit, which is defined by the gaseous fuel slots 83 formed in the stacked separators. The gaseous fuel flowing through the gaseous fuel conduit is fed through the flow paths 44P of gaseous fuel disposed in the respective unit cells 48 to the anodes 42 and is subjected to the electrochemical reaction expressed by Equation (1) given above. The gaseous fuel flowing through the flow paths 44P of gaseous fuel is led as a gaseous fuel exhaust into a gaseous fuel exhaust conduit, which is defined by the gaseous fuel slots 84 formed in the stacked separators. The gaseous fuel system is also connected to the gaseous fuel outlet 105 formed in the end plate 96, which is opposite to the end plate 95 receiving the supply of gaseous fuel. The gaseous fuel exhaust after the electrochemical reaction is discharged from the fuel cells 22 via the gaseous fuel outlet 105.

The oxidizing gas system is a device that feeds and discharges an oxygen-containing oxidizing gas to and from the fuel cells 22. The compressed air is used as the oxidizing gas in this embodiment. The oxidizing gas system includes a compressor, which compresses the ingested air and feeds the compressed air to the fuel cells 22.

The oxidizing gas system is connected to the oxidizing gas inlet 103 formed in the end plate 95 and introduces a supply of oxygen-containing oxidizing gas into the fuel cells 22 via the oxidizing gas inlet 103. The oxidizing gas fed into the fuel cells 22 via the oxidizing gas inlet 103 is introduced into an oxidizing gas conduit, which is defined by the oxidizing gas slots 85 formed in the stacked separators. The oxidizing gas flowing through the oxidizing gas conduit is fed through the flow paths 45P of oxidizing gas disposed in the respective unit cells 48 to the cathodes 43 and is subjected to the electrochemical reaction expressed by Equation (2) given above. The oxidizing gas flowing through the flow paths 45P of oxidizing gas is led as an oxidizing gas exhaust into an oxidizing gas exhaust conduit, which is defined by the oxidizing gas slots 86 formed in the stacked separators. The oxidizing gas system is also connected to the oxidizing gas outlet 106 formed in the end plate 96, which is opposite to the end plate 95 receiving the supply of oxidizing gas. The oxidizing gas exhaust after the electrochemical reaction is discharged from the fuel cells 22 via the oxidizing gas outlet 106.

The cooling water system 21 is connected to the cooling water hole 101 formed in the end plate 95 and introduces cooling water into the fuel cells 22 via the cooling water hole 101. The cooling water fed into the fuel cells 22 via the cooling water hole 101 is introduced into a cooling water conduit, which is defined by the cooling water holes 81 formed in the stacked separators. The cooling water flowing through the cooling water conduit is fed into the cooling water channel 87P defined by the cooling separator 80 and the terminal separator 60 and is subjected to heat exchange in the fuel cells 22. The hot cooling water heated through the cooling water channel 87P is led into a cooling water conduit, which is defined by the cooling water holes 82 formed in the stacked separators. The cooling water system 21 is also connected to the cooling water hole 104 formed in the end plate 96, which is opposite to the end plate 95 receiving the supply of cooling water. The hot cooling water heated through the heat exchange with the fuel cells 22 is discharged from the fuel cells 22 via the cooling water hole 104.

In the above description, the fuel cells 22 are constructed to have a single stack structure. In accordance with one application of the fuel-cells system 20, the fuel cells 22 may be constructed to have a plurality of stack structures arranged in series or in parallel according to the required output. Although the supply system of the gaseous fuel, the oxidizing gas, and the cooling water to the fuel cells 22 and the discharge system thereof from the fuel cells 22 are disposed on the opposite ends of the fuel cells 22 in this embodiment, the supply system and the discharge system may be arranged on an identical end of the fuel cells 22.

The detailed structure of the cooling water system 21, which is the essential part of the present invention, is described with the drawing of FIG. 1. The radiator 26 is a constituent of the cooling water system 21 as mentioned above and cools down the hot cooling water that has been fed to the fuel cells 22 and heated through the heat exchange in the fuel cells 22. The radiator 26 functions as a heat exchange unit with a flow path, which the hot cooling water flows through. The heat exchange unit has a structure that allows a flow of the outside air and carries out heat exchange between the flow of the outside air and the cooling water in the flow path. The radiator 26 is provided with the cooling fan 24 as described above. The cooling fan 24 is driven to produce a blast of the cooling air, which passes through the heat exchange unit and removes heat from the cooling water flown through the flow path, thereby implementing the positive cooling process of the cooling water. It is preferable that the radiator 26 and the cooling fan 24 included in the fuel-cells system 20 have the capabilities of sufficiently cooling down the cooling water in order to keep the driving temperature of the fuel cells 22 to or below a predetermined value (for example, 80° C.), even when the output current of the fuel cells 22 drastically fluctuates between its maximum (attained, for example, when the vehicle goes up a slope or abruptly accelerates) and its minimum (attained, for example, when the vehicle is at an idle) and the quantity of heat produced in the fuel cells 22 significantly varies. The cooling fan 24 is connected to the control unit 50, which controls the driving state or the on-off state of the cooling fan 24.

The cooling water pump 30 generates a driving force for circulating the cooling water in the cooling water flow path 28 as described previously. The driving amount of the cooling water pump 30 (that is, the pumping amount of the cooling water) is regulated by varying the driving voltage. The driving voltage may be varied in the range of 0 volt to 10 volt. The flow of the cooling water circulating through the cooling water flow path 28 reaches the maximum when the driving voltage is equal to 10 volt. The structure of the embodiment varies the driving voltage of the cooling water pump 30 to regulate the pumping amount of the cooling water, so as to equalize the temperature distribution in the fuel cells 22. It is accordingly preferable that the cooling water pump 30 included in the fuel-cells system 20 has the capability of regulating the flow of the cooling water to sufficiently equalize the temperature distribution in the fuel cells 22, even when the output current of the fuel cells 22 drastically fluctuates and the quantity of heat produced in the fuel cells 22 varies. The cooling water pump 30 is connected to the control unit 50, which regulates the magnitude of the driving voltage of the cooling water pump 30.

The cooling water flow path 28, which circulates the cooling water between the cooling water flow path in the fuel cells 22 and the cooling water flow path in the radiator 26, is provided with temperature sensors 32 and 34 for measuring temperature of the cooling water in the cooling water flow path 28. The temperature sensor 32 is disposed in the vicinity of a joint between the cooling water hole 101 on one end of the fuel cells 22 and the cooling water flow path 28. The temperature sensor 34 is disposed in the vicinity of a joint between the cooling water hole 104 on the other end of the fuel cells 22 and the cooling water flow path 28. The temperature sensor 32 measures temperature of the cooling water fed to the fuel cells 22 (inlet cooling water temperature T1), whereas the temperature sensor 34 measures temperature of the cooling water discharged from the fuel cells 22 (outlet cooling water temperature T2). These temperature sensors 32 and 34 are connected to the control unit 50, which receives information regarding the measured temperatures of the cooling water.

The control unit 50 is constructed as an arithmetic-logic circuit including a microcomputer. More specifically the control unit 50 includes a CPU 54 which executes a variety of operations according to preset control programs, a ROM 58, in which control programs and control data required for the variety of operations executed by the CPU 54 are stored in advance, a RAM 56, which various data required for the variety of operations executed by the CPU 54 are temporarily written in and read from, and an input-output port 52 which outputs driving signals based on the results of the operations by the CPU 54. The control unit 50 is connected to the temperature sensors 32 and 34 and receives the information regarding the temperatures of the cooling water. The control unit 50 is also connected to the cooling fan 24 and the cooling water pump 30 and outputs driving signals to these constituents.

The fuel-cells system 20 supplies the electric power to the motor for driving the electric vehicle as mentioned above. The fuel-cells system 20 accordingly includes a storage battery (not shown) having a predetermined capacity to ensure the required electric power at the time of starting the fuel-cells system 20. The storage battery is utilized as a power source for driving the cooling water pump 30, the cooling fan 24, and a variety of pumps included in the gaseous fuel system and the oxidizing gas system, while the fuel cells 22 can not supply a sufficient amount of electric power at the time of starting the fuel-cells system 20. The storage battery may have a sufficient capacity, which allows the electric vehicle to be driven only by the storage battery for a predetermined time period. This structure enables the electric vehicle to run irrespective of the heating condition of the fuel cells 22 at the time of starting the fuel-cells system 20.

Figure 11:
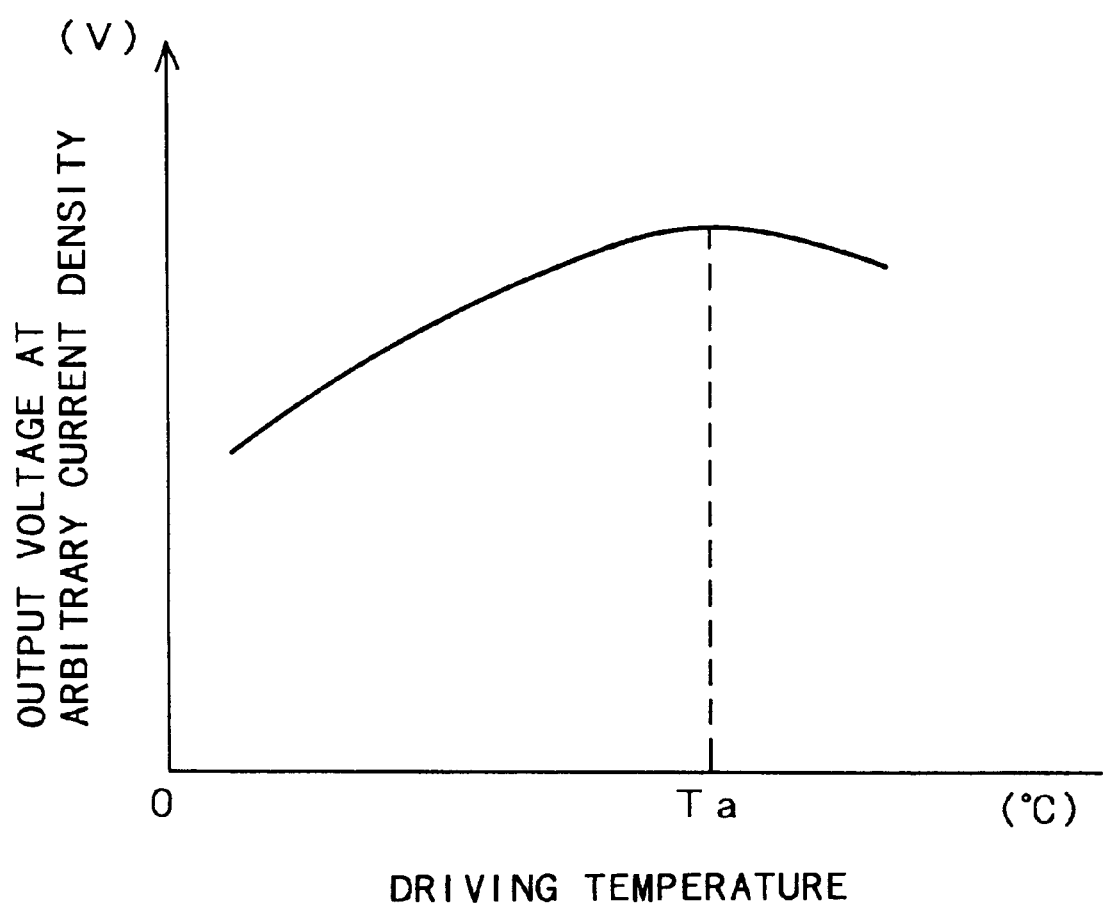
FIG. 11 is a graph showing the output voltage of a fuel cell plotted against the driving temperature of the fuel cell when the output current density of the fuel cell is kept constant.

The cooling water system 21 operates in the following manner, in order to keep the inside of the fuel cells 22 in a substantially uniform state at temperatures close to a predetermined desirable temperature (the temperature corresponding to Ta in the graph of FIG. 11). In the fuel-cells system 20 of the embodiment, the driving voltage of the cooling water pump 30 is regulated to equalize the internal temperature of the fuel cells 22, whereas the driving state of the cooling fan 24 is controlled to keep the internal temperature of the fuel cells 22 in a temperature range of 70 to 80° C. When it is determined that the internal temperature of the fuel cells 22 is in a predetermined non-uniform state, the driving amount of the cooling water pump 30 is increased to enhance the flow of the cooling water flowing through the flow path per unit time (that is, to enhance the flow rate), so as to equalize the internal temperature of the fuel cells 22. When the internal temperature of the fuel cells 22 exceeds the above temperature range, the cooling fan 24 is driven to positively cool down the cooling water and lower the internal temperature of the fuel cells 22.

The structure of the embodiment determines the distribution of the internal temperature of the fuel cells 22, based on a difference $\Delta T$ between the inlet cooling water temperature T1 and the outlet cooling water temperature T2. The value of the difference $\Delta T$ represents the temperature gradient in the fuel cells 22. This value is decreased by enhancing the flow rate of the cooling water and equalizing the temperature of the cooling water flowing through the fuel cells 22. The enhanced flow rate of the cooling water reduces the temperature gradient in the whole fuel cells 22 and equalizes the internal temperature of the fuel cells 22. The enhanced flow rate of the cooling water equalizes not only the temperature of the cooling water flowing through the fuel cells 22 but also the temperature of a specific unit cell, which shows a different temperature behavior from those of the peripheral unit cells, among the unit cells 48 constituting the fuel cells 22. The flow rate of the cooling water is regulated to make the value of the difference $\Delta T$ sufficiently small and thereby equalize the temperature distribution in the fuel cells 22.

In this embodiment, the driving state of the cooling water pump 30 is regulated to control the flow rate of the cooling water and make the value of the difference $\Delta T$ not greater than a predetermined reference value. The reference value may be set based on the efficiency of heat exchange between the fuel cells and the cooling water. In this embodiment, the reference value was experimentally determined in advance and set to 5° C. The relationship between the flow rate of the cooling water and the temperature distribution in the fuel cells was determined according to the following procedure. A stack structure was manufactured by laminating a predetermined number of unit cells (for example, 100 unit cells). The procedure measured the output voltage of each unit cell included in the stack structure and determined the difference $\Delta T$ while varying the flow rate of the cooling water fed to the stack structure. Such measurement shows the general tendency that an increase in flow rate of the cooling water decreases the value of the difference $\Delta T$ and thereby reduces the difference between the output voltages of the respective unit cells. The increased flow rate of the cooling water, however, increases the amount of the electric power consumed by the cooling water pump for circulating the cooling water. While the temperature distribution in the fuel cells is equalized to improve the efficiency of power generation, the increased amount of the electric power consumed by the cooling water pump rather lowers the energy efficiency of the whole fuel-cells system. In this embodiment, the reference value is set to 5° C. as the state that sufficiently exerts the favorable effects of the increased flow rate of the cooling water.

The structure of the embodiment determines the temperature in the fuel cells 22 based on the outlet cooling water temperature T2. The temperature of the cooling water discharged from the fuel cells 22 well reflects the internal temperature of the fuel cells 22. A mean internal temperature TFC of the fuel cells 22 may be approximated by $T2+\alpha$. In this embodiment, the temperature in the fuel cells 22 is estimated upon condition that the value of $\alpha$ is set equal to 10°C.

As discussed above, the fuel cells 22 produce heat with the progress of the electrochemical reactions. Unless the cooling fan 24 is driven to carry out the positive cooling process of the cooling water in the radiator 26, the internal temperature TFC of the fuel cells 22 gradually increases even in the state of circulating the cooling water. When the internal temperature TFC exceeds 80° C., the structure of the embodiment carries out the control to keep the cooling fan 24 operating until the internal temperature TFC is lowered to or below 70° C. This keeps the internal temperature TFC of the fuel cells 22 in the temperature range of 70 to 80°C.

Figure 5:
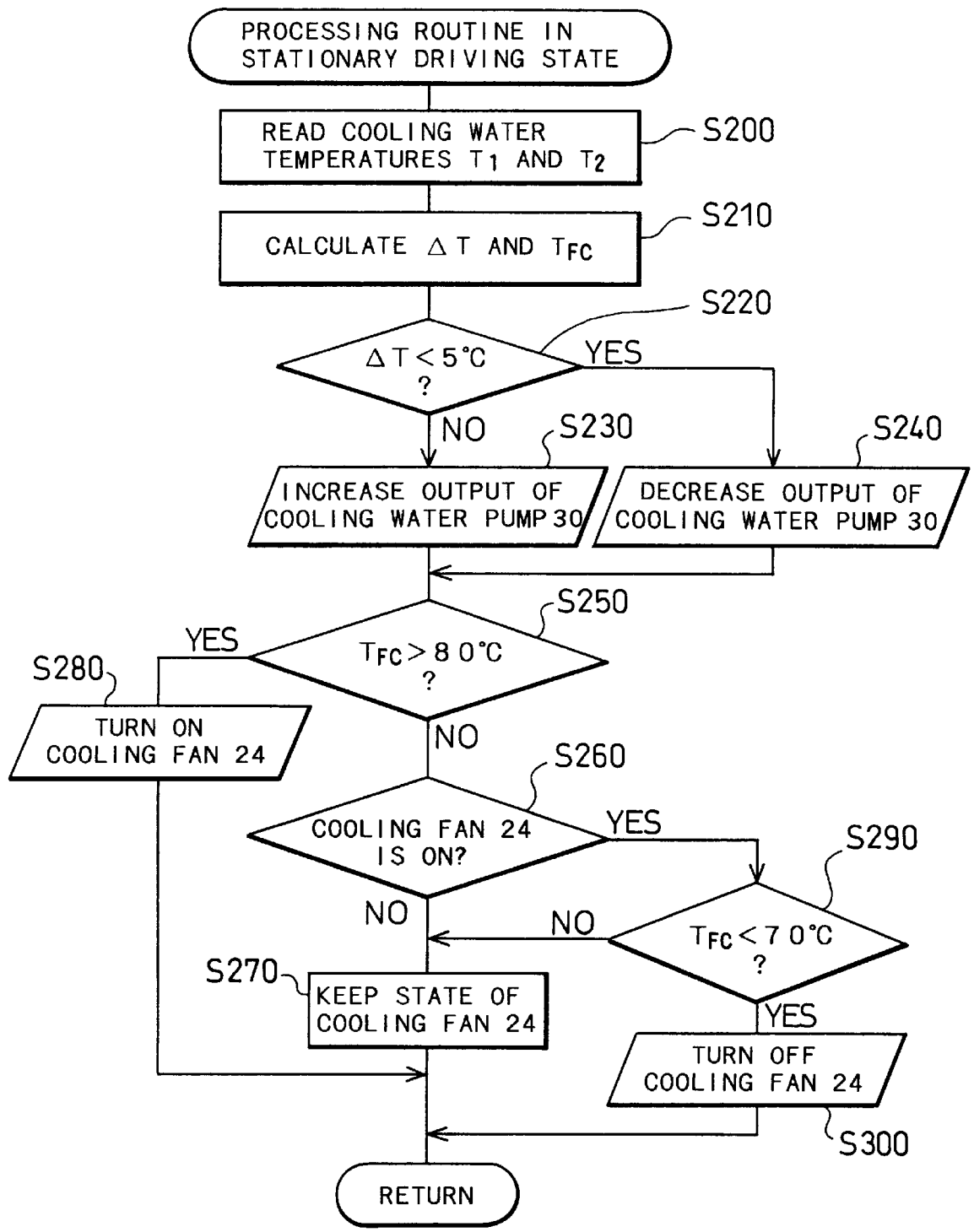
FIG. 5 is a flowchart showing a processing routine in stationary driving state executed in the fuel-cells system 20.
Figure 6A:
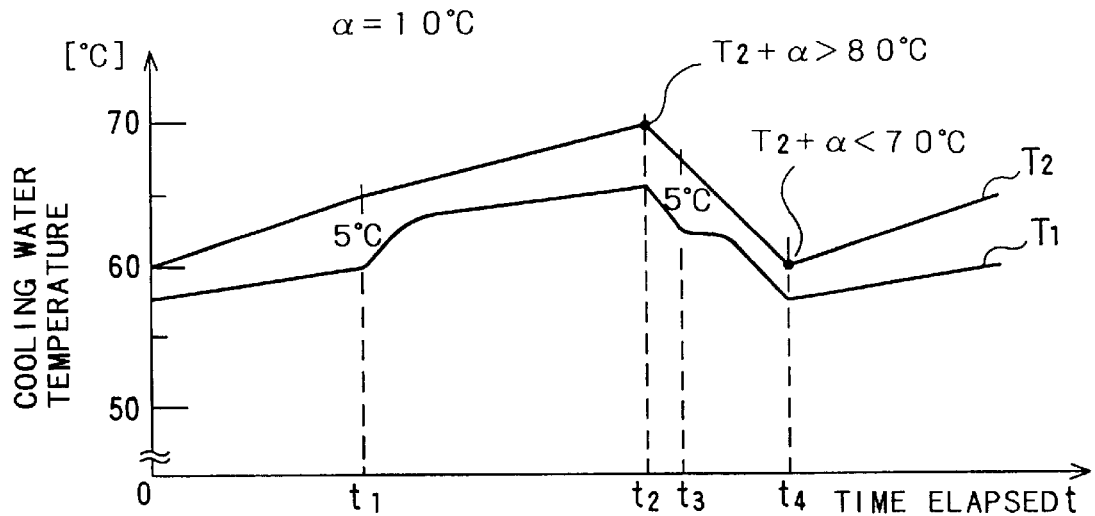
FIG. 6(A) shows a variation in temperature of cooling water.
Figure 6B:
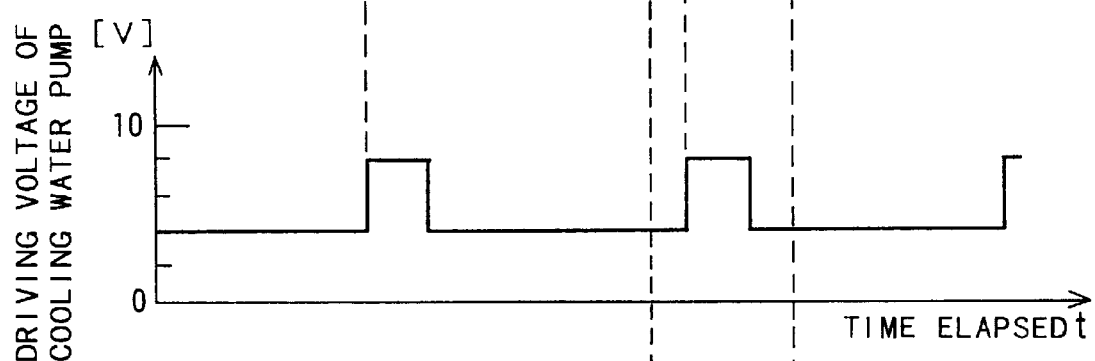
FIG. 6(B) shows regulation of the driving voltage of a cooling water pump 30.
Figure 6C:
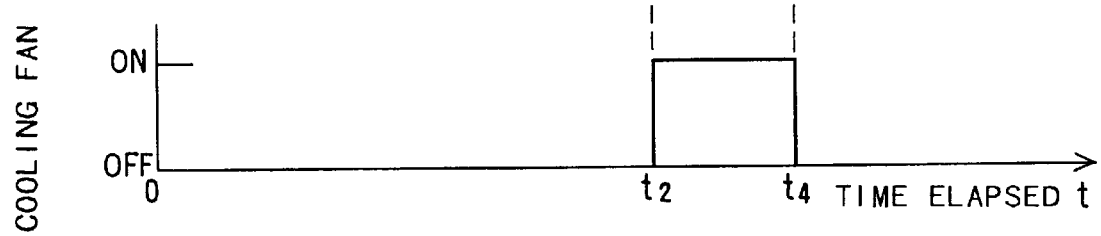
FIG. 6(C) shows the on-off control of a cooling fan 24.

A control process carried out when the fuel cells 22 are in the stationary state is described with the flowchart of FIG. 5 and the graphs of FIGS. 6(A), 6(B), and 6(C). FIG. 5 is a flowchart showing a processing routine in stationary driving state, which is executed at predetermined time intervals after the driving state of the fuel cells 22 reaches the stationary state. The fuel-cells system 20 executes a start-time processing routine discussed later at the time of starting the fuel-cells system 20. When the driving temperature of the fuel cells 22 reaches a predetermined level and it is determined that the driving state of the fuel cells 22 is in the stationary state, the CPU 54 executes the processing routine in stationary driving state. The graph of FIG. 6(A) shows a variation in temperature of the cooling water when the control process is carried out according to the processing routine in stationary driving state. The graph of FIG. 6(B) shows the regulation of the driving voltage of the cooling water pump 30 when the control process is carried out according to the processing routine in stationary driving state. The graph of FIG. 6(C) shows the on-off control of the cooling fan 24 when the control process is carried out according to the processing routine in stationary driving state. In all the graphs of FIGS. 6(A) through 6(C), the abscissa represents the time axis.

When the program enters the processing routine in stationary driving state, the CPU 54 first reads the inlet cooling water temperature T1 and the outlet cooling water temperature T2 from the temperature sensors 32 and 34 at step S200. The CPU 54 then calculates the difference $\Delta T$ between the inlet cooling water temperature T1 and the outlet cooling water temperature T2 and the internal temperature TFC of the fuel cells 22 from the input data at step S210. The internal temperature TFC is determined by adding 10° C. to the outlet cooling water temperature T2 as described previously.

It is then determined at step S220 whether or not the difference $\Delta T$ calculated at step S210 is less than the reference value set equal to 5° C. In the case that the value of the difference $\Delta T$ is less than 5° C., the program determines that the temperature distribution in the fuel cells 22 has been equalized sufficiently and proceeds to step S240. The CPU 54 drops the driving voltage of the cooling water pump 30 for a predetermined time period at step S240, so as to decrease the flow rate of the cooling water and reduce the energy consumption.

In the case that the value of the difference $\Delta T$ is not less than 5° C. at step S220, on the other hand, the program determines that the temperature distribution in the fuel cells 22 is in a non-uniform state and increases the driving voltage of the cooling water pump 30 for a predetermined time period at step S230. This increases the flow rate of the cooling water and equalizes the temperature distribution in the fuel cells 22. This operation is performed at a time point t1 and a time point t3 in the graph of FIG. 6. The value of the difference ΔT decreases with the increase in flow rate of the cooling water.

After the flow rate of the cooling water is increased to equalize the internal temperature of the fuel cells 22 at step S230 or after the program determines that the internal temperature of the fuel cells 22 has been equalized sufficiently and drops the driving voltage in the cooling water pump 30 at step S240, the program goes to step S250, at which the internal temperature TFC of the fuel cells 20 is compared with 80° C. When the internal temperature TFC of the fuel cells 22 exceeds 80° C., the program determines that the internal temperature of the fuel cells 22 is excessively high and drives the cooling fan 24 at step S280. This starts the positive cooling process of the cooling water. The program then exits from this routine. This operation is performed at a time point t2 in the graph of FIG. 6. Actuation of the cooling fan 24 cools down the cooling water and thereby lowers the internal temperature TFC of the fuel cells 22.

When the internal temperature TFC of the fuel cells 22 is not higher than 80° C. at step S250, on the other hand, the program determines whether the cooling fan 24 is in the ON state or in the OFF state at step S260. When the cooling fan 24 is at a stop or in the OFF state, the program determines that the internal temperature of the fuel cells TFC is not excessively high and that the positive cooling process of the cooling water is not required. The program accordingly keeps the cooling fan 24 in the OFF state at step S270 and exits from this routine. This operation is performed in a time period between the time point 0 and the time point t2 and in a time period after a time point t4 in the graph of FIG. 6. Since the cooling fan 24 is in the OFF state, the internal temperature TFC of the fuel cells 22 gradually increases with the progress of the electrochemical reactions in the fuel cells 22.

When it is determined that the cooling fan 24 is driven or in the ON state at step S260, on the other hand, the program proceeds to step S290 to compare the internal temperature TFC of the fuel cells 22 with 70° C. When the internal temperature TFC of the fuel cells 22 is not lower than 70° C. at step S290, the program determines that the internal temperature of the fuel cells 22 has not yet been lowered to the sufficient level after the internal temperature TFC of the fuel cells 22 once exceeds 80° C. and the cooling fan 24 starts operating. The program accordingly keeps the cooling fan 24 in the ON state at step S270 and exits from this routine. This operation is performed in a time period between the time point t2 and the time point t4 in the graph of FIG. 6. Since the cooling fan 22 is kept in the ON state, the internal temperature TFC of the fuel cells 22 continues decreasing.

When the internal temperature TFC of the fuel cells 22 is lower than 70° C. at step S290, on the contrary, the program determines that the actuation of the cooling fan 24 has sufficiently lowered the internal temperature of the fuel cells 22 and stops the operation of the cooling fan 24 at step S300. The program then exits from this routine. This operation is performed at the time point t4 in the graph of FIG. 6. After the cooling fan 24 is stopped, the internal temperature TFC of the fuel cells 22 starts increasing with the progress of the electrochemical reactions in the fuel cells 22.

The above control process is carried out in the stationary driving state of the fuel cells 22 as described in FIG. 5 and FIGS. 6(A) through 6(C). The operation of dropping the driving voltage of the cooling water pump 30 at step S240 is not specifically shown in the graph of FIG. 6(B). Only the operation of increasing the driving voltage of the cooling water pump 30 at step S230 when the value of the difference ΔT is not less than 5° C. is shown in the graph of FIG. 6(B). In the example of FIG. 6, the driving voltage of the cooling water pump 30 is switched between 4 V and 6V. In accordance with another application, the driving voltage of the cooling pump 30 may be varied stepwise. In this embodiment, the control process of increasing or dropping the driving voltage of the cooling water pump 30 is carried out for a predetermined time period. Another possible procedure feeds back the value of the difference ΔT and regulates the time period for which the driving voltage of the cooling water pump 30 is dropped or increased, based on the feed-back data. This procedure keeps the driving voltage of the cooling water pump 30 at the increased level until the value of the difference ΔT becomes less than the reference value. The procedure also keeps the driving voltage of the cooling water pump 30 at the dropped level while the value of the difference ΔT is less than the reference value.

In the fuel-cells system 20 of this embodiment thus constructed, when the temperature difference ΔT between the inlet cooling water temperature T1 and the outlet cooling water temperature T2 is not less than the reference value 5° C., the driving voltage of the cooling water pump 30 is increased to enhance the flow rate of the cooling water. As described previously, the temperature difference ΔT between the inlet cooling water temperature T1 and the outlet cooling water temperature T2 well reflects the temperature distribution in the fuel cells 22. When the temperature distribution in the fuel cells 22 is in the undesirable non-uniform state, this structure raises the flow rate of the cooling water based on the detection of the temperature difference and thereby quickly equalizes the temperature distribution in the fuel cells 22.

The increased flow rate of the cooling water not only reduces the temperature gradient of the cooling water between at the inlet and at the outlet but decreases the temperature gradient in each unit cell and the temperature difference between the respective unit cells. Even when there is a unit cell that shows a different temperature behavior from those of the peripheral unit cells, the enhanced flow rate of the cooling water equalizes the temperature of this unit cell with those of the peripheral unit cells. When a unit cell has a high-temperature range and a low-temperature range, the flow rate of the cooling water flowing through these ranges is increased to equalize the temperature distribution in this unit cell.

In the fuel-cells system 20 of the embodiment, the cooling water system 21 circulates the cooling water between the fuel cells 22 and the radiator 26. The increased flow rate of the cooling water lowers the efficiency of heat exchange in the radiator 26 and raises the temperature of the cooling water fed from the radiator 26 to the fuel cells 22. The enhanced flow rate of the cooling water accordingly increases the temperature of the inlet cooling water temperature Ti and reduces the difference ΔT more quickly.

In the above embodiment, when it is determined at step S220 in the flowchart of FIG. 5 that the difference ΔT between the inlet cooling water temperature T1 and the outlet cooling water temperature T2 is less than 5° C., the driving voltage of the cooling water pump 30 is dropped to decrease the flow rate of the cooling water. When the internal temperature of the fuel cells 22 has been equalized sufficiently, the structure of the embodiment lowers the flow rate of the cooling water and prevents the non-required consumption of energy. This accordingly keeps the energy efficiency of the whole fuel-cells system 20.

In the above embodiment, the internal temperature TFC of the fuel cells 22 is set equal to the sum of the outlet cooling water temperature T2 and α, which is fixed to 10° C. irrespective of the flow of the cooling water. The value α may be corrected by taking into account the variation in efficiency of heat exchange between the cooling water and the fuel cells with a variation in flow of the cooling water. In one possible structure applied to the case in which the value α is to be corrected according to the flow of the cooling water, the control unit 50 reads the driving voltage of the cooling water pump 30 and estimates the flow of the cooling water based on the input driving voltage. Another possible structure disposes a flow sensor in the cooling water flow path 28 and directly measures the flow of the cooling water passing through the inside of the fuel cells 22. Correction of the value α according to the flow of the cooling water enables the internal temperature of the fuel cells 22 to be regulated accurately in a desired temperature range.

In the embodiment described above, the CPU 54 controls on and off the cooling fan 24, based on the result of comparison between the calculated internal temperature TFC of the fuel cells 22 and a predetermined value (80° C. in the above embodiment) at step S250 in the flowchart of FIG. 5. In accordance with one preferable application, the difference ΔT between the inlet cooling water temperature T1 and the outlet cooling water temperature T2, which is calculated at step S210, may further be taken into account for the on-off control of the cooling fan 24. By way of example, even when the outlet cooling water temperature T2 is rather high, if the difference ΔT is sufficiently small, it can be determined that the amount of heat produced in the fuel cells 22 (that is, the amount of the electrochemical reactions proceeding in the fuel cells 22) is sufficiently small. This modified structure reduces the cooling degree of the cooling water by considering the small amount of heat produced in the fuel cells 22, thereby effectively preventing the internal temperature TFC of the fuel cells 22 from being lowered excessively. The structure of controlling on and off the cooling fan 24 by taking into account the difference ΔT between the inlet cooling water temperature T1 and the outlet cooling water temperature T2 enables the internal temperature of the fuel cells 22 to be kept accurately within the desired temperature range.

In accordance with another preferable application, values other than those directly relating to the cooling water (for example, the cooling water temperature or the flow rate of the cooling water) may be taken into account for the on-off control of the cooling fan 24. By way of example, the on-off control of the cooling fan 24 may be carried out according to the magnitude of the loading connected to the fuel-cells system 20 or the accelerator position, which represents the magnitude of the loading when the fuel-cells system 20 is mounted on the electric vehicle. The amount of the electrochemical reactions proceeding in the fuel cells 22 or the amount of heat produced in the fuel cells 22 increases with an increase in magnitude of the loading. The control procedure based on the values directly relating to the cooling water can thus be considered as the control procedure which is indirectly based on the magnitude of the loading. This modified structure, however, further takes into account the magnitude of the loading itself or the value representing the magnitude of the loading. The on-off control of the cooling fan 24 in this manner also enables the internal temperature of the fuel cells 22 to be kept accurately within the desired temperature range.

The above embodiment regards the control process carried out after the driving state of the fuel cells 22 reaches the stationary state. A similar control process is carried out at the time of starting the fuel-cells system 20. The difference from the control process of this embodiment is that the cooling fan 24 is not driven to carry out the positive cooling process of the cooling water since the internal temperature of the fuel cells 22 has not yet increased to a sufficient level at the time of starting the fuel-cells system 20. The control process carried out at the time of starting the fuel-cells system 20 causes the electrochemical reactions to gradually proceed and increase the internal temperature of the fuel cells 22, while controlling the driving state of the cooling water pump 30 to equalize the internal temperature of the fuel cells 22.

Figure 7:
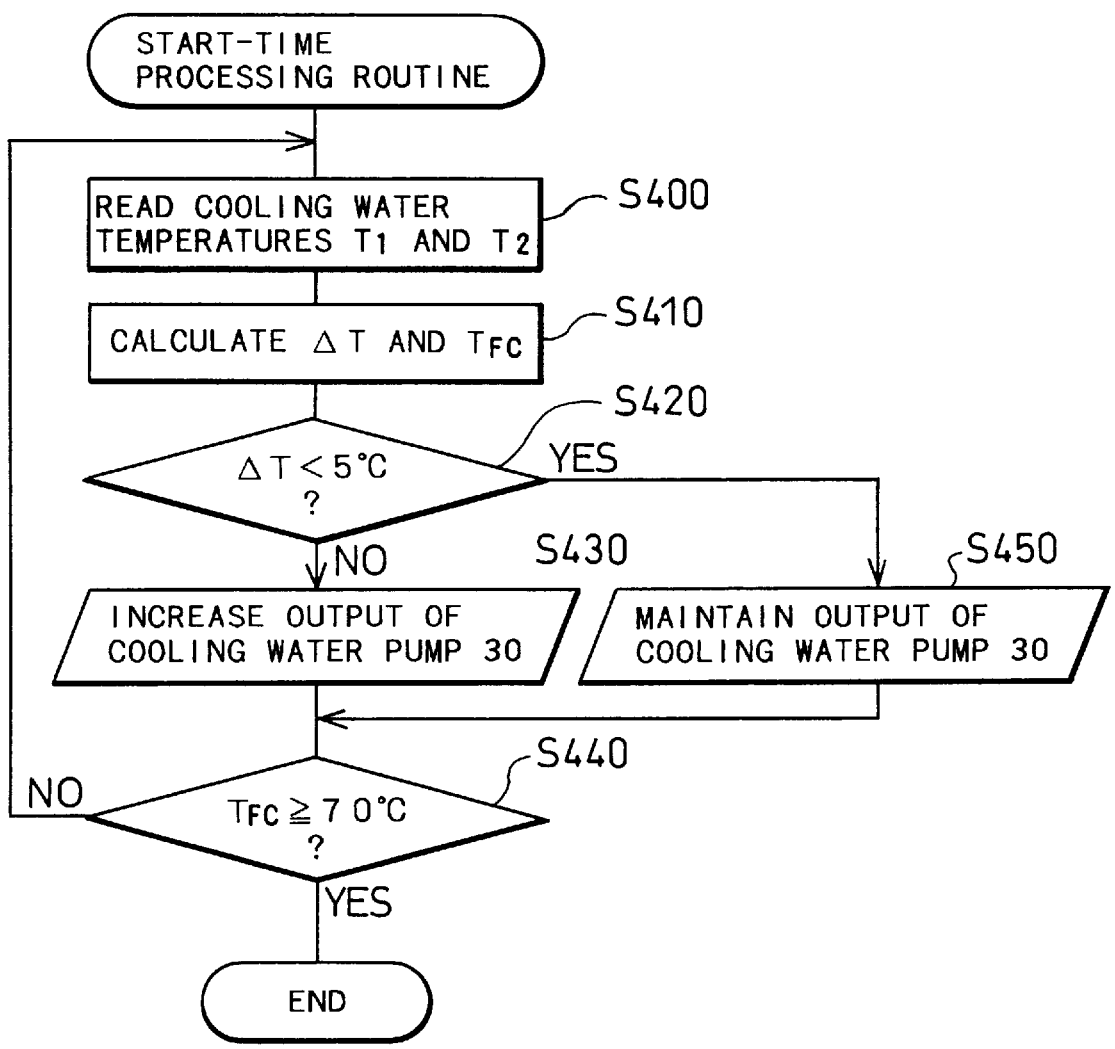
FIG. 7 is a flowchart showing a start-time processing routine executed in the fuel-cells system 20.
Figure 8A:
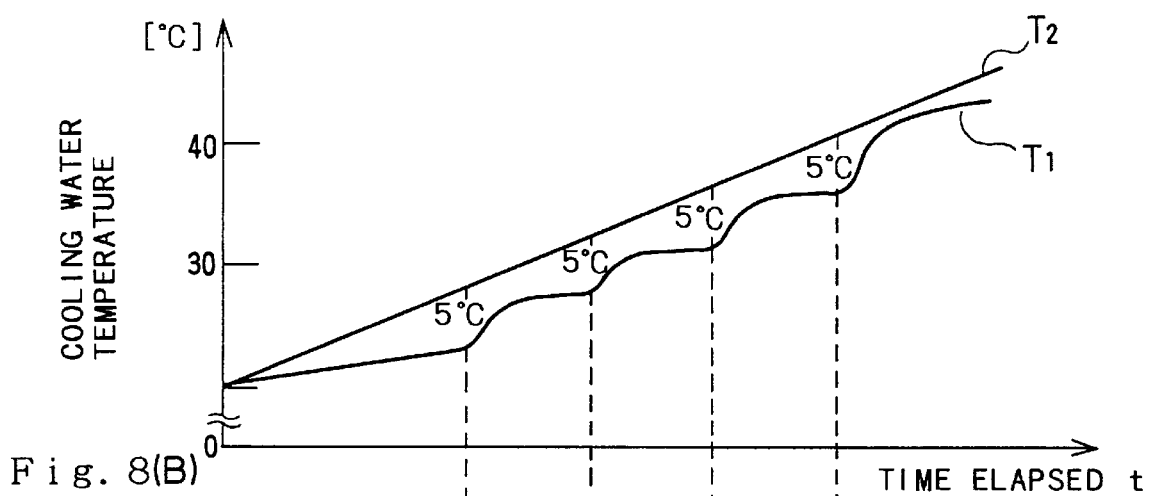
FIG. 8(A) shows a variation in temperature of cooling water.
Figure 8B:
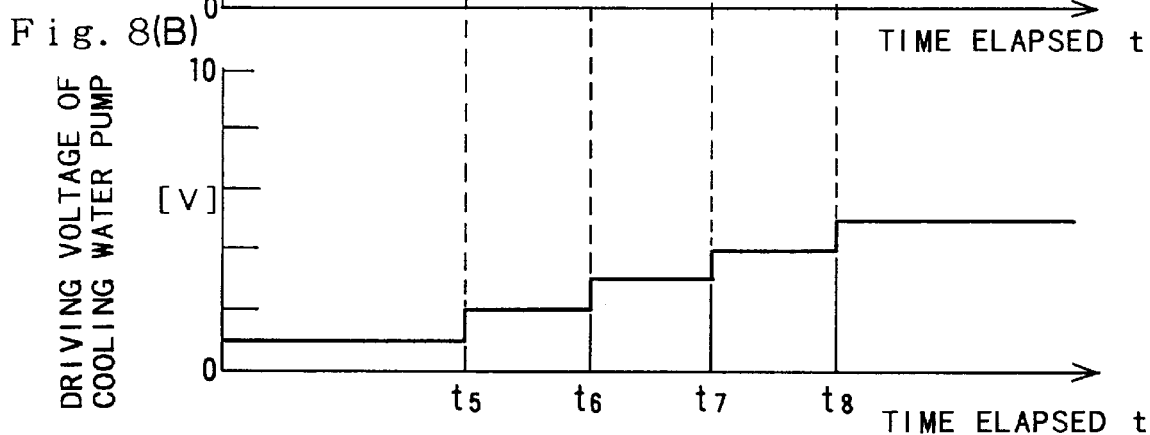
FIG. 8(B) shows regulation of the driving voltage of the cooling water pump 30.

The following describes a control process carried out at the time of starting the fuel-cells system 20 before the driving state of the fuel cells 22 reaches the stationary state, as a second embodiment according to the present invention with the flowchart of FIG. 7 and the graphs of FIGS. 8(A) and 8(B). FIG. 7 is a flowchart showing a start-time processing routine executed at the time of starting the fuel-cells system 20. This start-time processing routine is carried out when the driver of the electric vehicle with the fuel-cells system 20 mounted thereon operates a predetermined start switch and instructs to start the fuel-cells system 20. The graph of FIG. 8(A) shows a variation in temperature of the cooling water when the control process is carried out according to the start-time processing routine. The graph of FIG. 8(B) shows the regulation of the driving voltage of the cooling water pump 30 when the control process is carried out according to the start-time processing routine. In both the graphs of FIGS. 8(A) and 8(B), the abscissa represents the time axis. Referring to FIG. 8(B), at the time of starting the fuel-cells system 20, the driving voltage of the cooling water pump 30 is gradually increased with a variation in value of the difference ΔT. When the driver operates the predetermined start switch and instructs to start the fuel-cells system 20, the cooling water pump 30 is driven at a preset start-time driving voltage (1 V in this embodiment).

When the program enters the start-time processing routine, the CPU 54 first reads the inlet cooling water temperature T1 and the outlet cooling water temperature T2 from the temperature sensors 32 and 34 at step S400. The CPU 54 then calculates the difference ΔT between the inlet cooling water temperature T1 and the outlet cooling water temperature T2 and the internal temperature TFC of the fuel cells 22 from the input data at step S410. The internal temperature TFC is determined by adding 10° C. to the outlet cooling water temperature T2 as described previously.

It is then determined at step S420 whether or not the difference ΔT calculated at step S410 is less than the reference value set equal to 5° C. In the case that the value of the difference ΔT is less than 5° C., the program determines that the temperature distribution in the fuel cells 22 has been equalized sufficiently and proceeds to step S450 to maintain the output of the cooling water pump 30. This operation is performed in a time period between the time point 0 and a time point t5, in a time period between the time point t5 and a time point t6, in a time period between the time point t6 and a time point t7, in a time period between the time point t7 and a time point t8, and in a time period after the time point t8 in the graph of FIG. 8. In these time periods, both the outlet cooling water temperature T2 and the inlet cooling water temperature T1 increase with the increase in degree of the electrochemical reactions proceeding in the fuel cells 22. The temperature of the cooling water is low at the time of starting the fuel-cells system 20, and the value of the difference ΔT gradually increases with the increase in degree of the electrochemical reactions and in quantity of heat produced in the fuel cells 22.

When the value of the difference ΔT is not less than 5° C. at step S420, the program determines that the temperature distribution in the fuel cells 22 is in the non-uniform state and increases the output of the cooling water pump 30 by one step (by one V in this embodiment) at step S430. This enhances the flow rate of the cooling water and equalizes the temperature distribution in the fuel cells 22. This operation is performed at the time points t5, t6, t7, and t8 in the graph of FIG. 8. The enhanced flow rate of the cooling water results in decreasing the value of the difference 66 T.

After controlling the driving state of the cooling water pump 30 according to the value of the difference ΔT, the program determines whether or not the internal temperature TFC of the fuel cells 22 is not lower than 70° C. at step S440. When the internal temperature TFC of the fuel cells 22 is lower than 70° C., the program determines that the fuel-cells system 20 is still in the starting state and returns to step S400. The program then repeats the operation of controlling the driving voltage of the cooling water pump 30 according to the value of the difference ΔT until the internal temperature TFC of the fuel cells 22 becomes not lower than 70° C. When the internal temperature TFC of the fuel cells 22 is not lower than 70° C. at step S440, on the other hand, the program determines that the fuel-cells system 20 has already reached the stationary state and exits from this routine. The program then activates the processing routine in stationary driving state discussed previously.

At the time of starting the fuel-cells system 20, the above processing is carried out to increase the internal temperature of the fuel cells 22 to the level allowing operation in the stationary state (that is, 70° C.), while sufficiently equalizing the internal temperature of the fuel cells 22. At the time of starting the fuel-cells system 20, the driving voltage of the cooling water pump 30 is set to a small value. The flow rate of the cooling water is low while the electrochemical reactions proceed in the fuel cells 22 to a small degree. This efficiently increases the internal temperature of the fuel cells 22. The driving voltage of the cooling water pump 30 is set to a small value at the time of starting the fuel-cells system 20 and is raised with an increase in internal temperature of the fuel cells 22. This structure effectively prevents the cooling water pump 30 from wasting the electric power and thereby maintains the high energy efficiency in the fuel-cells system 20.

In the fuel cells 22, the quantity of heat produced therein increases with the progress of the electrochemical reactions. In the normal driving environment, the internal temperature of the fuel cells 22 continuously increases while the cooling fan 24 is at a stop. In specific environments, however, the fuel cells 22 may be overcooled even when the cooling fan 24 is at a stop. Such environments include that the electric vehicle with the fuel-cells system 20 mounted thereon drives in a cold district, that the radiator 26 is affected by the wind while the electric vehicle runs at a high speed, and that the small load connected to the fuel cells 22 causes only a small quantity of heat to be produced in the course of the electrochemical reactions. The fuel-cells system 20 having the function of preventing the fuel cells 22 from being overcooled when the temperature of the cooling water is decreased while the cooling fan 24 is at a stop is described as a third embodiment according to the present invention. In the case that the radiator 26 affected by the strong wind cools down the cooling water, which may cause the fuel cells 22 to be overcooled, even when the cooling fan 24 is at a stop, the fuel-cells system 20 of the third embodiment rotates the cooling fan 24 in a reversed direction and thereby interferes with the wind passing through the radiator 26.

Figure 9:
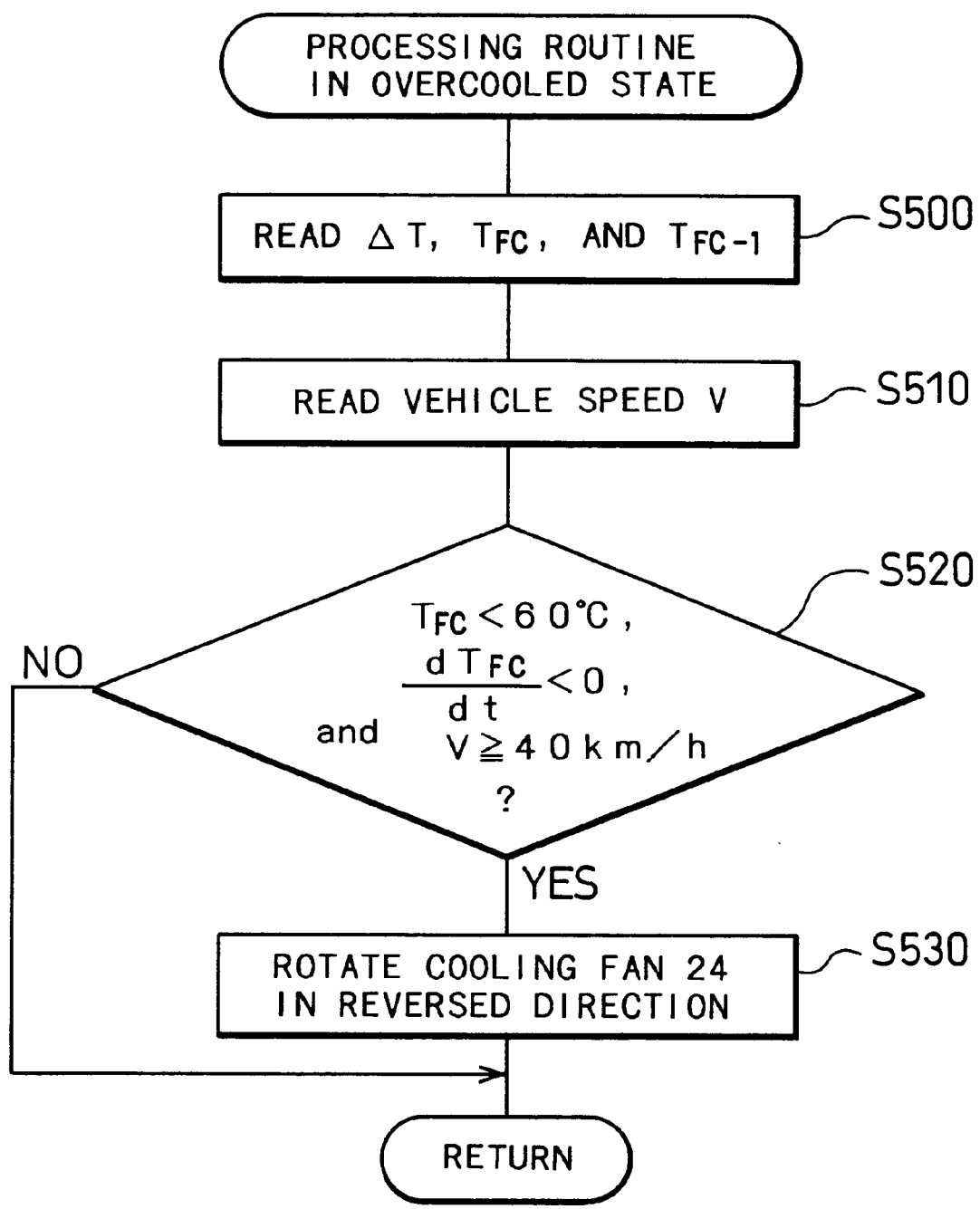
FIG. 9 is a flowchart showing a processing routine in overcooled state executed in the fuel-cells system 20.

FIG. 9 is a flowchart showing a processing routine in overcooled state executed in the fuel-cells system 20 of the third embodiment. The routine of FIG. 9 is carried out at predetermined time intervals after the internal temperature of the fuel cells 22 becomes equal to or higher than the predetermined level (70° C.) and the fuel-cells system 20 has reached the stationary state, like the processing routine in stationary driving state shown in the flowchart of FIG. 5. When the program enters the routine of FIG. 9, the CPU 54 first reads data of ΔT, TFC, and TFC-1 from the RAM 56 at step S500. The data of ΔT, TFC, and TFC-1 read at step S500 respectively correspond to the value of ΔT and the value of TFC calculated at step S210 in the last cycle of the processing routine in stationary driving state and the value of TFC calculated at step S210 in the cycle before last of the processing routine in stationary driving state. These values have been temporarily stored in the RAM 56. The CPU 54 subsequently reads a vehicle speed V of the electric vehicle from a speed sensor incorporated in the electric vehicle with the fuel-cells system 20 mounted thereon at step S510.

The program then proceeds to step S520 to determine whether or not all the required conditions are fulfilled. The required conditions are that the internal temperature TFC of the fuel cells 22 is lower than 60° C., that the internal temperature TFC of the fuel cells 22 has a decreasing tendency, and that the vehicle speed V is not lower than 40 km/h. The tendency of the internal temperature TFC of the fuel cells 22 is determined by comparing the value of TFC with the value of TFC-1. In accordance with a concrete procedure, when dTFC/dt is negative, where dTFC= (TFC-TFC-1), it is determined that the internal temperature TFC of the fuel cells 22 has a decreasing tendency. In the case that the internal temperature TFC is not lower than 60° C., the program determines that the fuel cells 22 has not yet been in the overcooled state. In case that the internal temperature TFC does not have a decreasing tendency, the program determines that a stop of the cooling fan 24 sufficiently heats up the inside of the fuel cells 22. In the case that the vehicle speed V is lower than 40 km/h, the program determines that the radiator 26 is not significantly affected by the wind. When any one of the above conditions is not fulfilled at step S520, the program determines that the fuel cells 22 does not fall into the overcooled state due to the effect of the wind and exits from this routine.

In the case that all the conditions are fulfilled at step S520, on the other hand, the program determines that only a small quantity of heat is produced in the fuel cells 22 due to the low external temperature or the small loading and that the radiator 26 affected by the strong wind continues cooling down the cooling water even when the cooling fan 24 is at a stop. The program accordingly determines that the fuel cells 22 are in the overcooled state, and rotates the cooling fan 24 in a reversed direction at step S530. The program then exits from this routine. The reversed rotation of the cooling fan 24 interferes with the flow of the wind passing through the radiator 26. In this embodiment, the operation of reversely rotating the cooling fan 24 at step S530 is performed for a predetermined time period. The time period for which the cooling fan 24 is rotated in the reversed direction may be controlled by taking into account the magnitude of the loading connected to the fuel cells 22 and the variation in vehicle speed V.

In the case that the radiator 26 affected by the strong wind under the condition of the low external temperature or the small loading continues cooling down the cooling water even when the cooling fan 24 is at a stop and causes the fuel cells 22 to be in the overcooled state, the fuel-cells system 20 of the third embodiment thus constructed reduces the effect of the wind. The reversed rotation of the cooling fan 24 presses back the wind entering the radiator 26, and thereby prevents the cooling water flowing through the radiator 26 from being cooled down by the wind.

Figure 10A:
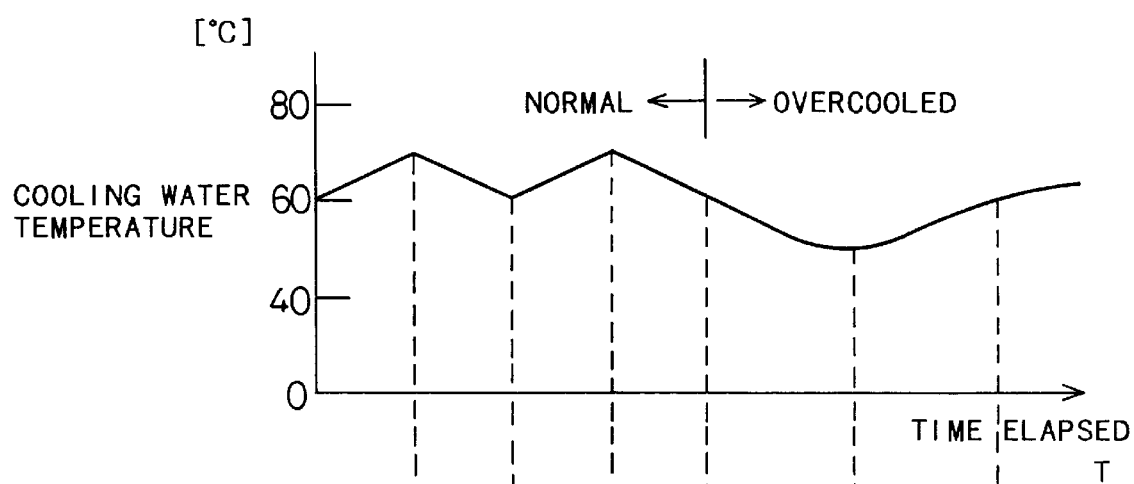
FIG. 10(A) shows a variation in outlet cooling water temperature T2 discharged from the fuel cells 22.
Figure 10B:
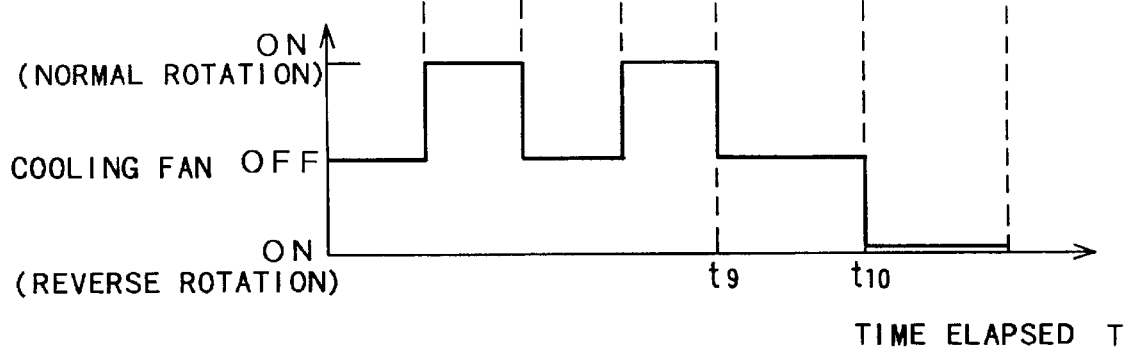
FIG. 10(B) shows the driving state of the cooling fan 24.

FIGS. 10(A) and 10(B) show the normal state in which the control procedure normally turns on and off the cooling fan 24 and the overcooled state in which the control procedure reversely rotates the cooling fan 24. FIG. 10(A) shows a variation in outlet cooling water temperature T2 discharged from the fuel cells 22, whereas FIG. 10(B) shows the driving state of the cooling fan 24. In the normal state, the internal temperature of the fuel cells 22 gradually increases while the cooling fan 24 is at a stop as described previously. When the outlet cooling water temperature T2 reaches 70° C., the cooling fan 24 is turned on and continuously driven until the outlet cooling water temperature T2 decreases to 60° C. In case that the quantity of heat produced in the fuel cells 22 is decreased due to the low external temperature or the small loading and the high vehicle speed V causes the radiator 26 to be affected by the strong wind, the outlet cooling water temperature T2 continues decreasing even when the cooling fan 24 is at a stop (in a time period after a time point t9 in the graph of FIG. 10). When the outlet cooling water temperature T2 becomes equal to or lower than 50° C., the cooling fan 24 is driven in the reversed direction to depress the effect of the wind (at a time point t10 in the graph of FIG. 10), and the outlet cooling water temperature T2 starts increasing.

The third embodiment of the present invention regards the case in which the fuel-cells system 20 is driven in the stationary state. A similar control procedure may, however, be carried out at the time of starting the fuel-cells system 20. The fuel-cells system 20 has a storage battery as mentioned previously. The storage battery having a sufficient capacity enables the electric vehicle to run even before the fuel cells 22 have been heated to generate a sufficient amount of electric power. At the start of the fuel-cells system 20, the quantity of heat produced in the fuel cells 22 is kept relatively small while the amount of power generation gradually increases. As discussed in the third embodiment, when the electric vehicle runs at a high speed, the radiator 26 affected by the strong wind continues cooling down the cooling water and may prevent the fuel cells 22 from being heated to the stationary state.

In accordance with one preferable application, at the time of starting the fuel-cells system 20, a procedure similar to the processing routine in the overcooled state of the third embodiment is carried out with the start-time processing routine of the second embodiment. Even when the vehicle runs at a high speed at the time of starting the fuel-cells system 20, this procedure reduces the effect of the wind and enables the fuel cells 22 to be heated up to the stationary state. The procedure carried out at the time of starting the fuel-cells system 20 omits the determination regarding the internal temperature TFC of the fuel cells 22 from the process of step S520 in the processing routine in overcooled state of FIG. 9.

In the third embodiment, the cooling fan 24 is rotated in the reversed direction in case that the effect of the wind possibly causes the fuel cells 22 to be overcooled. A different structure may also be adopted to interfere with the effect of the wind. By way of example, a structure of interfering with the flow of the wind is located in the flow path of the wind, instead of rotating the cooling fan 24 in the reversed direction. The structure of opening and closing the flow path of the wind is disposed at the inlet or at the outlet of the flow path of the wind passing through the vehicle or in the vicinity of the radiator 26. The structure generally keeps the flow path in the open position. When the fuel cells 22 are in the overcooled state, the structure closes the flow path, instead of reversely rotating the cooling fan 24. This structure exerts the same effects as those of the third embodiment and reduces the amount of electric power consumed to interfere with the flow of the wind, compared with the structure of reversely rotating the cooling fan 24.

Still another structure of preventing the fuel cells 22 from being overcooled by the effect of the wind has a bypass that bypasses the radiator 26 in the cooling water flow path 28. A changeover valve for changing the flow path in response to a driving signal from the control unit 50 is disposed at a joint of the general flow path passing through the radiator 26 and the bypass. In the case that there is a possibility of overcooling the fuel cells 22, the changeover valve changes the flow path of the cooling water to cause the cooling water to run through the bypass, thereby preventing the fuel cells 22 from being overcooled. This structure also exerts the same effects as those of the third embodiment and reduces the amount of electric power consumed to interfere with the flow of the wind, compared with the structure of reversely rotating the cooling fan 24.

In the above embodiments, the internal temperature TFC of the fuel cells 22 is regulated to the range of 70° C. to 80° C. The optimum driving temperature of the fuel cells is also affected by the moistening state of the gaseous fuel as well as a variation in hydrogen partial pressure in the course of moistening the gaseous fuel. It is accordingly desirable to set the optimum driving temperature of the fuel cells by taking into account the amount of energy consumed in the moistening process, so as to make the state of the fuel-cells system approach the state of optimum energy efficiency. In the case that the reformed gas obtained by reforming a hydrocarbon crude fuel is used as the gaseous fuel, the efficiency of power generation of the fuel cells may be affected by the catalyst poisoning with carbon monoxide included in the reformed gas. In this case, the increased driving temperature of the fuel cells reduces the degree of catalyst poisoning. In the case that the reformed gas is used as the gaseous fuel, the desirable structure accordingly sets the driving temperature of the fuel cells by taking into account the effect of carbon monoxide.

In the above embodiments, the hot cooling water heated through the fuel cells 22 is cooled down through the radiator 26, to which a blast of the cooling air is fed from the cooling fan 24. Another procedure may alternatively be applied to decrease the temperature of the cooling water. In the case that the gaseous fuel fed to the fuel cells is gaseous hydrogen and the gaseous hydrogen is absorbed in the hydrogen-absorbing alloy for storage, it is required to heat the hydrogen-absorbing alloy in the process of taking hydrogen out of the hydrogen-absorbing alloy. The heat possessed by the hot cooling water heated through the fuel cells 22 may be utilized to release hydrogen from the hydrogen-absorbing alloy. In this case, regulation of the flow rate of the cooling water passing through the fuel cells 22 equalizes the temperature distribution in the fuel cells 22.

In the fuel-cells system 20 of the above embodiments, the cooling water flow path 28 included in the cooling water system 21 is a closed path that circulates the cooling water between the fuel cells 22 and the radiator 26. One modified structure moistens the gaseous fuel with the hot cooling water heated through the fuel cells 22. When the hot cooling water comes into contact with the gaseous fuel via a steam-permeable hollow film, a specific amount of steam corresponding to the temperature of the cooling water and the temperature of the gaseous fuel can be transmitted from the cooling water to the gaseous fuel. In the fuel-cells system of this structure, an additional supply of cooling water is given to compensate for the amount consumed for moistening the gaseous fuel. The additional supply of cooling water may be water produced through the electrochemical reactions proceeding in the fuel cells 22. In this case, regulation of the flow rate of the cooling water passing through the fuel cells 22 equalizes the temperature distribution in the fuel cells 22.

In the above embodiments, cooling water is used as the cooling liquid for cooling down the fuel cells 22. Another liquid may, however, be applied for the cooling liquid. Especially when the cooling liquid flow path is constructed as a closed path that circulates the cooling liquid between the fuel cells 22 and the radiator 26 like the above embodiments, there is a high degree of freedom in selection of the cooling liquid. When an antifreezing solution is used as the cooling liquid, the cooling liquid does not freeze at a stop of the fuel-cells system even when the external temperature is below zero. There is accordingly no need of melting the cooling liquid at the time of restarting the fuel-cells system. The antifreezing solution effectively shortens the warm-up time of the fuel-cells system even when the external temperature is below zero.

In the embodiments discussed above, the fuel-cells system 20 of the present invention is mounted on the electric vehicle and supplies the electric power to the motor for driving the vehicle. The fuel-cells system 20 of the present invention may be applied for different purposes. For example, the principle of the present invention is applicable to the case in which the magnitude of the loading fluctuates to some extent and the heating state in the fuel cells is varied. This enables the internal temperature of the fuel cells to be equalized in the state close to the optimum temperature and keeps the output state of the fuel cells in a favorable range.

Although the fuel-cells system in the above embodiments includes polymer electrolyte fuel cells, the fuel-cells system may have another type of fuel cells, such as phosphate fuel cells and aqueous alkaline electrolyte fuel cells. In such cases, the suitable coolant should be selected according to the respective driving conditions. Regulation of the flow rate of the coolant passing through the fuel cells enables the temperature distribution in the fuel cells to be effectively equalized.

The present invention is not restricted to the above embodiments or their modifications, but there may be many other modifications, changes, and alterations without departing from the scope or spirit of the main characteristics of the present invention.

It should be clearly understood that the above embodiments are only illustrative and not restrictive in any sense. The scope and spirit of the present invention are limited only by the terms of the appended claims.

What is claimed is:

1. A fuel-cells system comprising a fuel cell which receives a supply of gaseous fuel containing at least hydrogen and a supply of oxidizing gas containing at least oxygen and generates an electromotive force through an electrochemical reaction of the gaseous fuel and the oxidizing gas, said fuel-cells system comprising:

a cooling liquid feed unit which feeds a cooling liquid to said fuel cell, the cooling liquid passing through said fuel cell and thereby cooling down said fuel cell;

a temperature distribution detection unit which detects a value reflecting a state of temperature distribution in said fuel cell; and a cooling liquid feed control unit which determines whether or not the state of temperature distribution in said fuel cell corresponds to a predetermined non-uniform state, based on the detection by said temperature distribution detection unit, and when the state of temperature distribution is determined to be the predetermined non-uniform state, controls said cooling liquid feed unit to increase a flow of the cooling liquid fed to said fuel cell per unit time.

2. A fuel-cells system in accordance with claim 1, wherein said temperature distribution detection unit detects a difference between a temperature of the cooling liquid flown into said fuel cell and a temperature of the cooling liquid flown out of said fuel cell as the value reflecting the state of temperature distribution in said fuel cell, and said cooling liquid feed control unit determines that the state of temperature distribution in said fuel cell corresponds to the predetermined non-uniform state when the detected difference is not less than a predetermined value.

3. A fuel-cells system in accordance with claim 2, said fuel-cells system further comprising:

a load which receives a supply of electric power from said fuel cell;

a loading state detection unit which determines a magnitude of said load;

a cooling liquid cooling unit which cools down the cooling liquid that is fed to said fuel cell; and a cooling state control unit which controls said cooling liquid cooling unit to cool down the cooling liquid when the magnitude of said load determined by said loading state detection unit is not less than a preset value.

4. A fuel-cells system in accordance with claim 3, wherein said loading state detection unit determines the magnitude of said load, based on the temperature of the cooling liquid flown out of said fuel cell.

5. A fuel-cells system in accordance with claim 4, wherein said loading state detection unit determines the magnitude of said load, based on the difference between the temperature of the cooling liquid flown into said fuel cell and the temperature of the cooling liquid flown out of said fuel cell as well as the temperature itself of the cooling liquid flown out of said fuel cell.

6. A fuel-cells system in accordance with claim 4, wherein said loading state detection unit determines the magnitude of said load, based on the flow of the cooling liquid fed to said fuel cell per unit time as well as the temperature of the cooling liquid flown out of said fuel cell.

7. A fuel-cells system in accordance with claim 1, said fuel-cells system further comprising:

a load which receives a supply of electric power from said fuel cell;

a loading state detection unit which determines a magnitude of said load;

a cooling liquid cooling unit which cools down the cooling liquid that is fed to said fuel cell; and a cooling state control unit which controls said cooling liquid cooling unit to cool down the cooling liquid when the magnitude of said load determined by said loading state detection unit is not less than a preset value.

8. A fuel-cells system in accordance with claim 7, wherein said loading state detection unit determines the magnitude of said load, based on the temperature of the cooling liquid flown out of said fuel cell.

9. A fuel-cells system in accordance with claim 8, wherein said loading state detection unit determines the magnitude of said load, based on the difference between the temperature of the cooling liquid flown into said fuel cell and the temperature of the cooling liquid flown out of said fuel cell as well as the temperature itself of the cooling liquid flown out of said fuel cell.

10. A fuel-cells system in accordance with claim 8, wherein said loading state detection unit determines the magnitude of said load, based on the flow of the cooling liquid fed to said fuel cell per unit time as well as the temperature of the cooling liquid flown out of said fuel cell.

11. A fuel-cells system in accordance with claim 8, said fuel-cells system further comprising:
an outside temperature detection unit which detects a value reflecting an outside temperature,
wherein said cooling state control unit controls said cooling liquid cooling unit, based on the result of the determination by said loading state detection unit as well as on the value reflecting the outside temperature detected by said outside temperature detection unit.

12. A fuel-cells system in accordance with claim 8, wherein said cooling liquid cooling unit comprises an air-cooling unit which cools down the cooling liquid fed to said fuel cell,
said fuel-cells system further comprising:
an ingested air state detection unit which detects a value reflecting a flow rate of an external air that is ingested from outside and passes through said air-cooling unit; and
an outer air restriction unit which restricts a flow of the external air that passes through said air-cooling unit, when the value reflecting the flow rate of the external air detected by said ingested air state detection unit is not less than a predetermined value.

13. A fuel-cells system in accordance with claim 12, wherein said cooling liquid cooling unit further comprises a cooling fan that is disposed in said air-cooling unit and produces a flow of air for cooling down the cooling liquid, and
said outer air restriction unit regulates a rotating direction of said cooling fan, so as to restrict the flow of the external air passing through said air-cooling unit.

14. A fuel-cells system in accordance with claim 7, said fuel-cells system further comprising:
an outside temperature detection unit which detects a value reflecting an outside temperature,
wherein said cooling state control unit controls said cooling liquid cooling unit, based on the result of the determination by said loading state detection unit as well as on the value reflecting the outside temperature detected by said outside temperature detection unit.

15. A fuel-cells system in accordance with claim 14, wherein said cooling liquid cooling unit comprises an air-cooling unit which cools down the cooling liquid fed to said fuel cell,
said fuel-cells system further comprising:
an ingested air state detection unit which detects a value reflecting a flow rate of an external air that is ingested from outside and passes through said air-cooling unit; and
an outer air restriction unit which restricts a flow of the external air that passes through said air-cooling unit, when the value reflecting the flow rate of the external air detected by said ingested air state detection unit is not less than a predetermined value.

16. A fuel-cells system in accordance with claim 15, wherein said cooling liquid cooling unit further comprises a cooling fan that is disposed in said air-cooling unit and produces a flow of air for cooling down the cooling liquid, and
said outer air restriction unit regulates a rotating direction of said cooling fan, so as to restrict the flow of the external air passing through said air-cooling unit.

17. A fuel-cells system in accordance with claim 7, wherein said cooling liquid cooling unit comprises an air-cooling unit which cools down the cooling liquid fed to said fuel cell,
said fuel-cells system further comprising:
an ingested air state detection unit which detects a value reflecting a flow rate of an external air that is ingested from outside and passes through said air-cooling unit; and
an outer air restriction unit which restricts a flow of the external air that passes through said air-cooling unit, when the value reflecting the flow rate of the external air detected by said ingested air state detection unit is not less than a predetermined value.

18. A fuel-cells system in accordance with claim 17, wherein said cooling liquid cooling unit further comprises a cooling fan that is disposed in said air-cooling unit and produces a flow of air for cooling down the cooling liquid, and
said outer air restriction unit regulates a rotating direction of said cooling fan, so as to restrict the flow of the external air passing through said air-cooling unit.

19. A method of regulating temperature in a fuel-cells system that comprises a fuel cell which receives a supply of gaseous fuel containing at least hydrogen and a supply of oxidizing gas containing at least oxygen and generates an electromotive force through an electrochemical reaction of the gaseous fuel and the oxidizing gas, said method comprising the steps of:
(a) feeding a cooling liquid for cooling down said fuel cell to said fuel cell and causing the cooling liquid to pass through said fuel cell;
(b) detecting a value reflecting a distribution of internal temperature of said fuel cell;
(c) determining whether or not the distribution of internal temperature of said fuel cells is in a predetermined non-uniform state, based on the value detected in said step (b); and
(d) increasing a flow of the cooling liquid flowing through said fuel cell per unit time, when it is determined in said step (c) that the distribution of internal temperature of said fuel cell is in the predetermined non-uniform state.

20. A method in accordance with claim 19, said method further comprising the steps of:
(e) determining a magnitude of a load which receives a supply of electric power from said fuel cell; and
(f) cooling down the cooling liquid fed to said fuel cell, when the magnitude of said load determined in said step (e) is not less than a preset value.

* * * * *